(12) United States Patent
McKenzie

(10) Patent No.: US 11,003,708 B2
(45) Date of Patent: *May 11, 2021

(54) INTERACTIVE MUSIC FEEDBACK SYSTEM

(71) Applicant: Trent R McKenzie, Austin, TX (US)

(72) Inventor: Trent R McKenzie, Austin, TX (US)

(73) Assignee: Trent R. McKenzie, Austin, TX (US)

( * ) Notice: Subject to any disclaimer, the term of this patent is extended or adjusted under 35 U.S.C. 154(b) by 302 days.

This patent is subject to a terminal disclaimer.

(21) Appl. No.: 16/256,198

(22) Filed: Jan. 24, 2019

(65) Prior Publication Data
US 2019/0171666 A1    Jun. 6, 2019

Related U.S. Application Data

(63) Continuation-in-part of application No. 16/120,261, filed on Sep. 1, 2018, now Pat. No. 10,795,929, which
(Continued)

(51) Int. Cl.
*G06F 16/58* (2019.01)
*G06F 16/907* (2019.01)
(Continued)

(52) U.S. Cl.
CPC ........ *G06F 16/5866* (2019.01); *G06F 16/638* (2019.01); *G06F 16/686* (2019.01);
(Continued)

(58) Field of Classification Search
CPC .............. G06F 16/5866; G06F 16/907; G06F 16/9038; G06F 16/686; G06F 3/04847; G06F 3/04842
See application file for complete search history.

(56) References Cited

U.S. PATENT DOCUMENTS 6,963,848 B1    11/2005  Brinkerhoff
7,301,944 B1    11/2007  Redmond
(Continued)

OTHER PUBLICATIONS

WDD staff, "Common Elements Used in Interface Button Design," published on Apr. 27, 2011, downloaded at https://www.webdesignerdepot.com/2011/04/common-elements-used-in-interface-button-design/ (Year: 2011).*

(Continued)

*Primary Examiner* — Eric J Yoon

(57) ABSTRACT

The present invention is directed to a tool that enables songwriters to efficiently solicit and analyze listener feedback during the songwriting process. To begin, a songwriter uploads a song to an online platform. The online platform presents the song and a feedback interface to a music listener. As the song plays, the listener provides feedback about the song using the feedback interface. For example, the listener may indicate that she likes or dislikes a particular element of the song, such as an instrument, at a specific point in time. The feedback is timestamped, processed, and presented to the songwriter fix analysis. Provided feedback may also be used for recommending subsequent songs to the listener. The interactive music feedback system described herein may integrate with a variety of music streaming platforms.

20 Claims, 16 Drawing Sheets

Related U.S. Application Data is a continuation of application No. 14/261,764, filed on Apr. 25, 2014, now Pat. No. 10,102,224.

(60) Provisional application No. 61/815,965, filed on Apr. 25, 2013.

(51) Int. Cl.
| | |
|---|---|
| *G06F 16/68* | (2019.01) |
| *G06F 16/9038* | (2019.01) |
| *G11B 27/00* | (2006.01) |
| *H04N 21/2743* | (2011.01) |
| *H04N 21/475* | (2011.01) |
| *H04N 21/81* | (2011.01) |
| *G06F 16/638* | (2019.01) |
| *H04N 21/4788* | (2011.01) |
| *H04N 21/482* | (2011.01) |

(52) U.S. Cl.
CPC ........ *G06F 16/907* (2019.01); *G06F 16/9038* (2019.01); *G11B 27/00* (2013.01); *H04N 21/2743* (2013.01); *H04N 21/4756* (2013.01); *H04N 21/4788* (2013.01); *H04N 21/8113* (2013.01); *H04N 21/4826* (2013.01)

(56) References Cited

U.S. PATENT DOCUMENTS

| | | | |
|---|---|---|---|
| 8,918,312 | B1 | 12/2014 | Rehling |
| 9,325,653 | B1* | 4/2016 | Peterson ............. H04L 12/1813 |
| 2002/0032776 | A1 | 3/2002 | Hasegawa |
| 2003/0014262 | A1 | 1/2003 | Kim |
| 2003/0089218 | A1* | 5/2003 | Gang .................. G10H 1/0008 84/615 |
| 2004/0049534 | A1 | 3/2004 | Nickerson |
| 2005/0125444 | A1 | 6/2005 | Grigorian |
| 2006/0212444 | A1 | 9/2006 | Handman |
| 2008/0082394 | A1 | 4/2008 | Floyd |
| 2008/0109415 | A1 | 5/2008 | Yabe |
| 2010/0191689 | A1 | 7/2010 | Cortes |
| 2013/0124653 | A1* | 5/2013 | Vick ...................... H04L 51/32 709/206 |
| 2013/0145385 | A1* | 6/2013 | Aghajanyan ......... H04N 21/251 725/10 |
| 2014/0099973 | A1 | 4/2014 | Cecchini |
| 2014/0281981 | A1* | 9/2014 | Yoshikawa ........... G06F 16/686 715/716 |

OTHER PUBLICATIONS

M. Wilkening, "Top 10 Drum Songs," published May 31, 2011 as indicated in the waybackmachine.org, downloaded from http://ultimateclassicrock.com/top-drum-songs/.
U.S. Appl. No. 14/261,764.
U.S. Appl. No. 61/815,965.
U.S. Appl. No. 16/120,261.

* cited by examiner

INTERACTIVE MUSIC FEEDBACK SYSTEM

CROSS REFERENCES TO OTHER RELATED APPLICATIONS

This application is a continuation-in-part (CIP) of and claims priority to U.S. patent application Ser. No. 16/120,261, filed on Sep. 1, 2018, which is a continuation of and claims priority to U.S. patent application Ser. No. 14/261,764, filed on Apr. 25, 2014 and issued as U.S. Pat. No. 10,102,224 on Oct. 16, 2018, which claims priority to and is a non-provisional patent application of U.S. Provisional Patent Application No. 61/815,965, filed on Apr. 25, 2013. The contents of each aforementioned patent application and/or issued patent are hereby incorporated by reference in entirety.

BACKGROUND

When producing music, a songwriter may seek the opinions of others—bandmates, producers, collaborators, trusted advisors, focus groups, target audiences, fans, listeners, live audiences, and/or the general public. For example, the songwriter may desire to know what a listener likes or dislikes about a particular song. This listener feedback could inform the songwriter's creative decisions and allow the songwriter to tailor his music to listener preferences and/or audience demands. Accordingly, there is a need for a tool that enables songwriters to efficiently solicit and analyze listener feedback during the songwriting process.

BRIEF SUMMARY

The present invention is directed to a tool that enables songwriters to efficiently solicit and analyze listener feedback during the songwriting process. To begin, a songwriter uploads a song to an online platform. The online platform presents the song and a feedback interface to a music listener. As the song plays, the listener provides feedback about the song using the feedback interface. For example, the listener may indicate that she likes or dislikes a particular element of the song, such as an instrument, at a specific point in time. The feedback is timestamped, processed, and presented to the songwriter for analysis. Provided feedback may also be used for recommending subsequent songs to the listener. The interactive music feedback system described herein may integrate with a variety of music streaming platforms.

BRIEF DESCRIPTION OF THE DRAWINGS

Having thus described embodiments of the invention in general terms, reference will now be made to the accompanying drawings.

Figure 1:
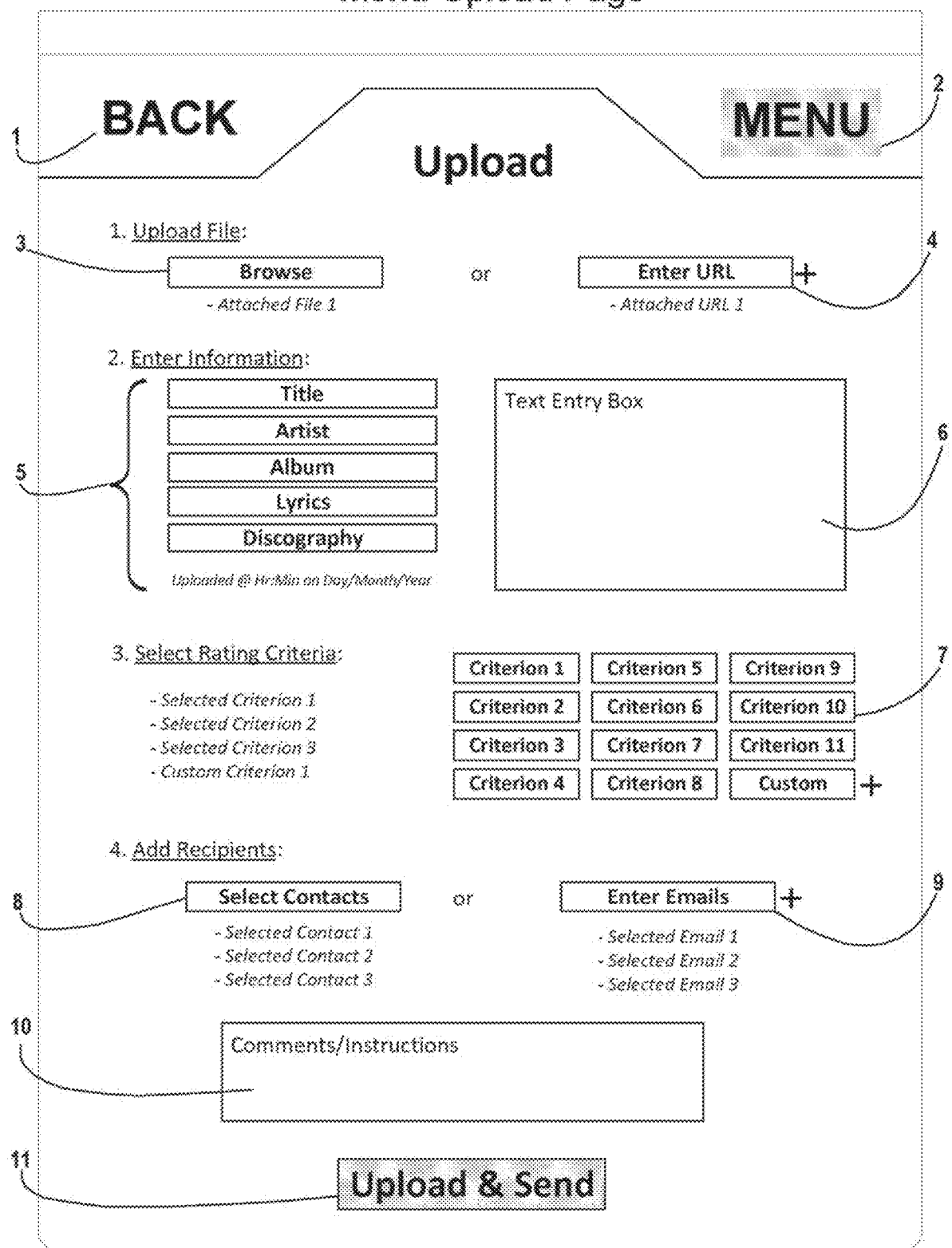

FIG. 1 is an exemplary user interface for enabling a songwriter to upload a song, in accordance with embodiments of the present invention.

Figure 2:
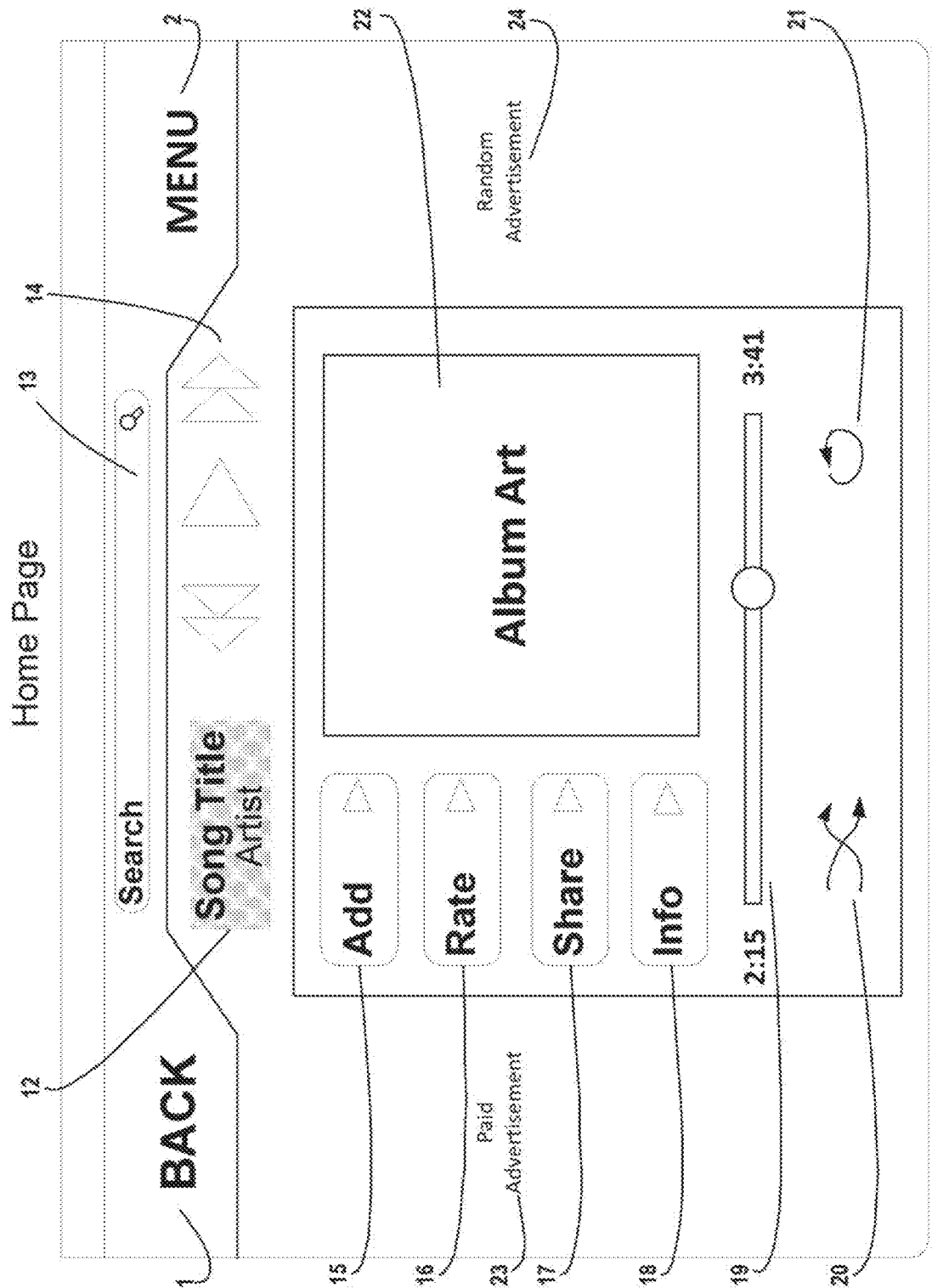

FIG. 2 is an exemplary user interface for a listener's home page, in accordance with embodiments of the present invention.

Figure 3:
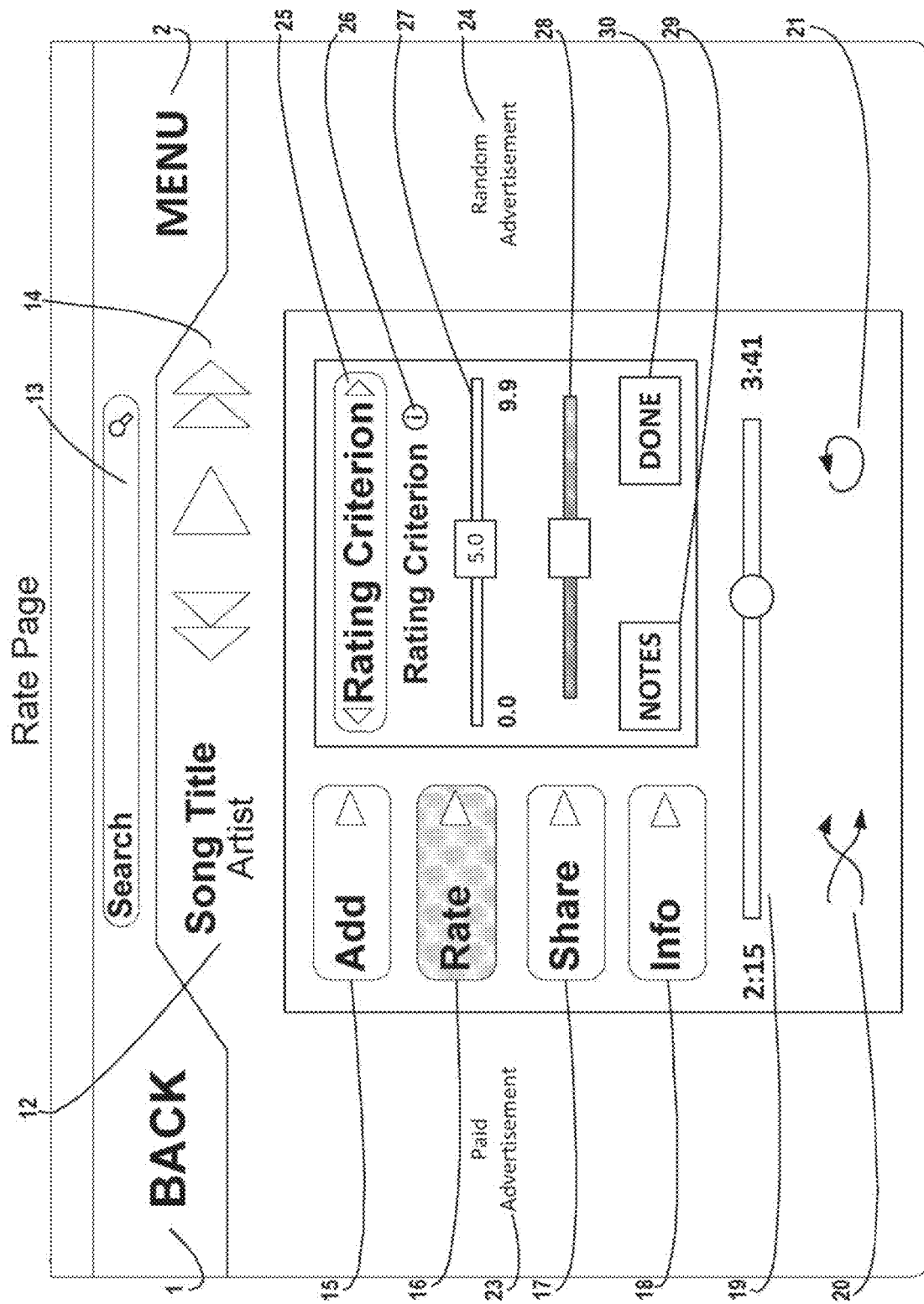

FIG. 3 is an exemplary user interface for enabling a listener to provide feedback during playback of a song, in accordance with embodiments of the present invention.

Figure 4:
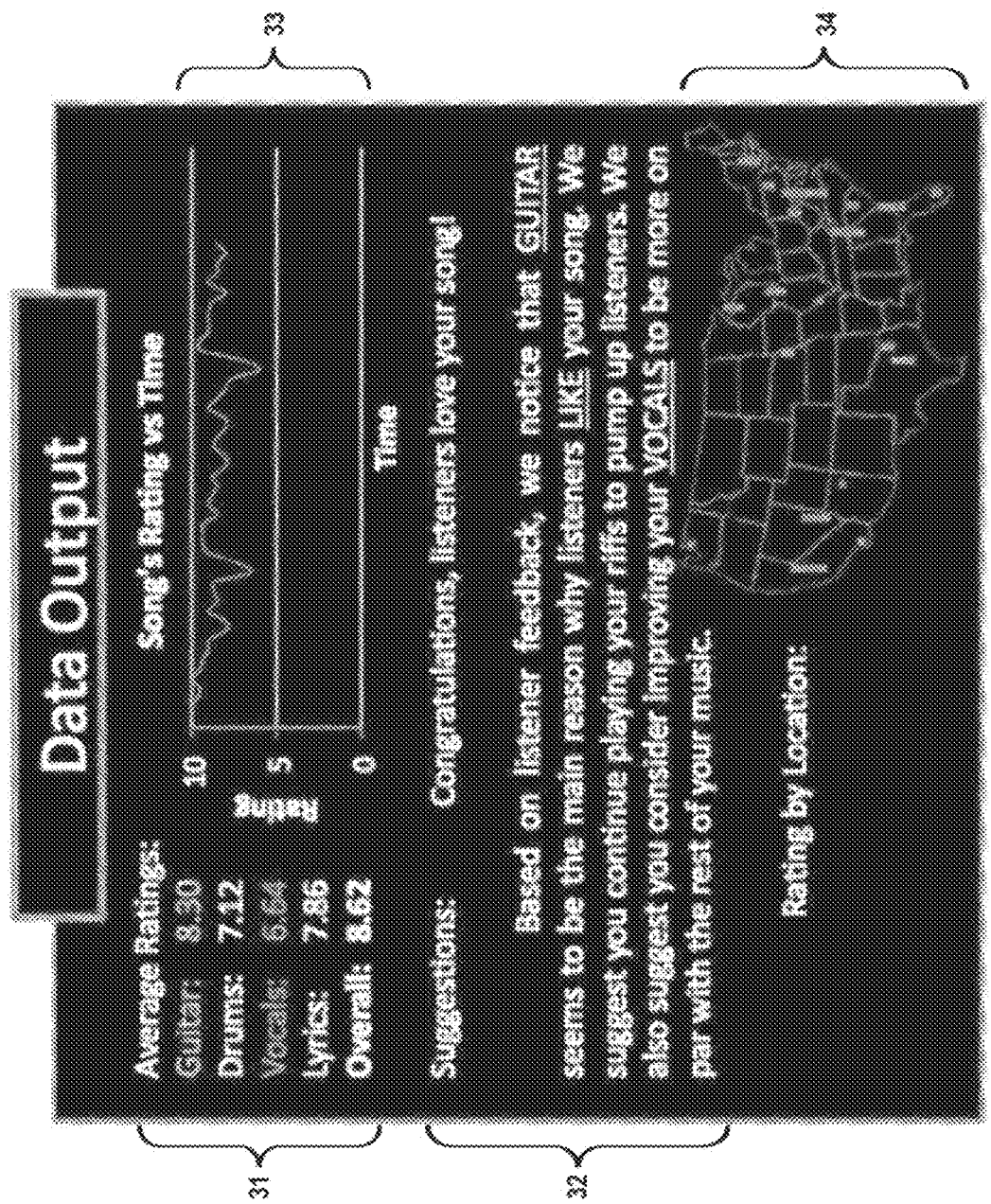

FIG. 4 is an exemplary user interface for presenting song feedback to the songwriter, in accordance with embodiments of the present invention.

Figure 5:
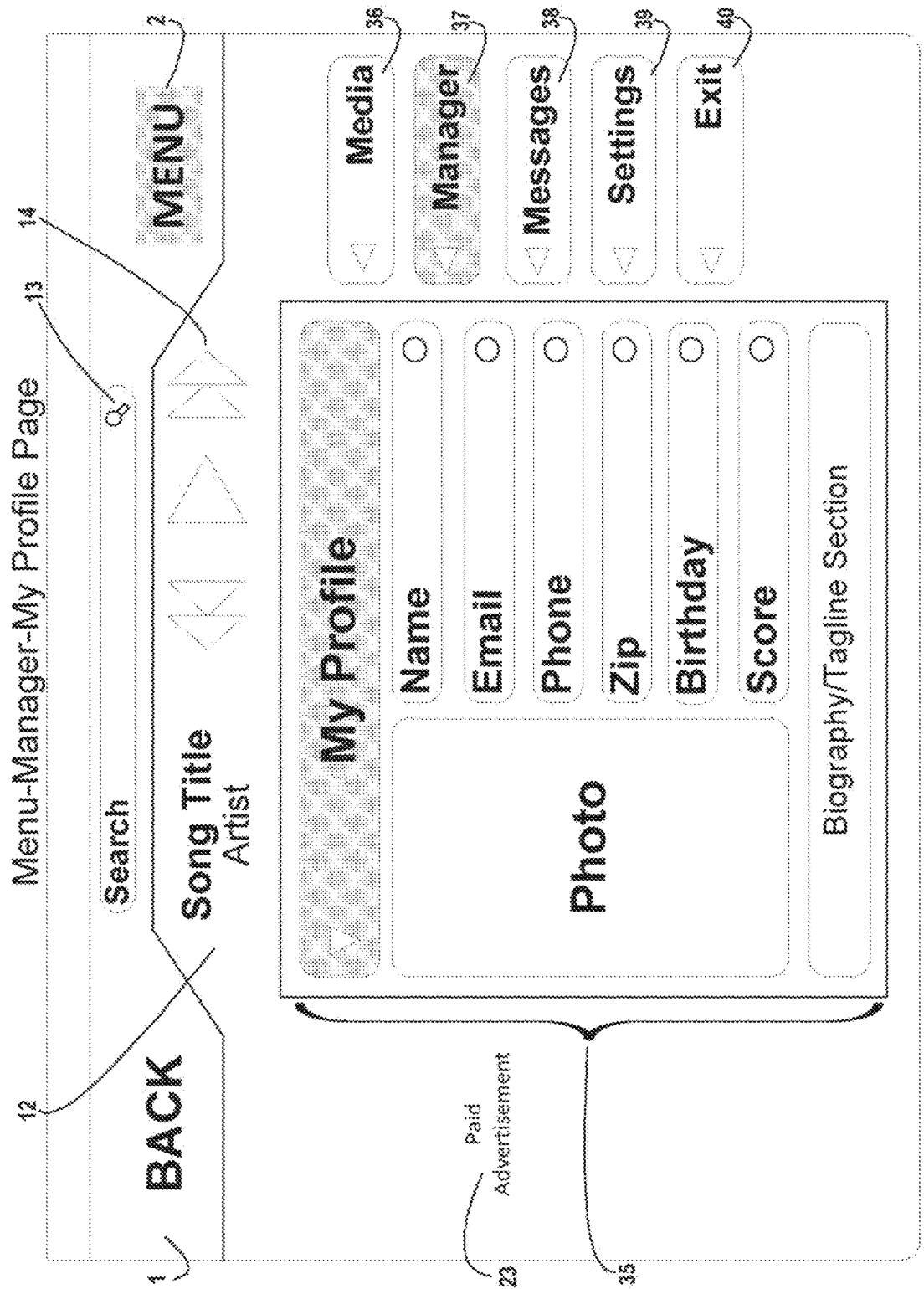

FIG. 5 is an exemplary user interface for a user profile, in accordance with embodiments of the present invention.

Figure 6:
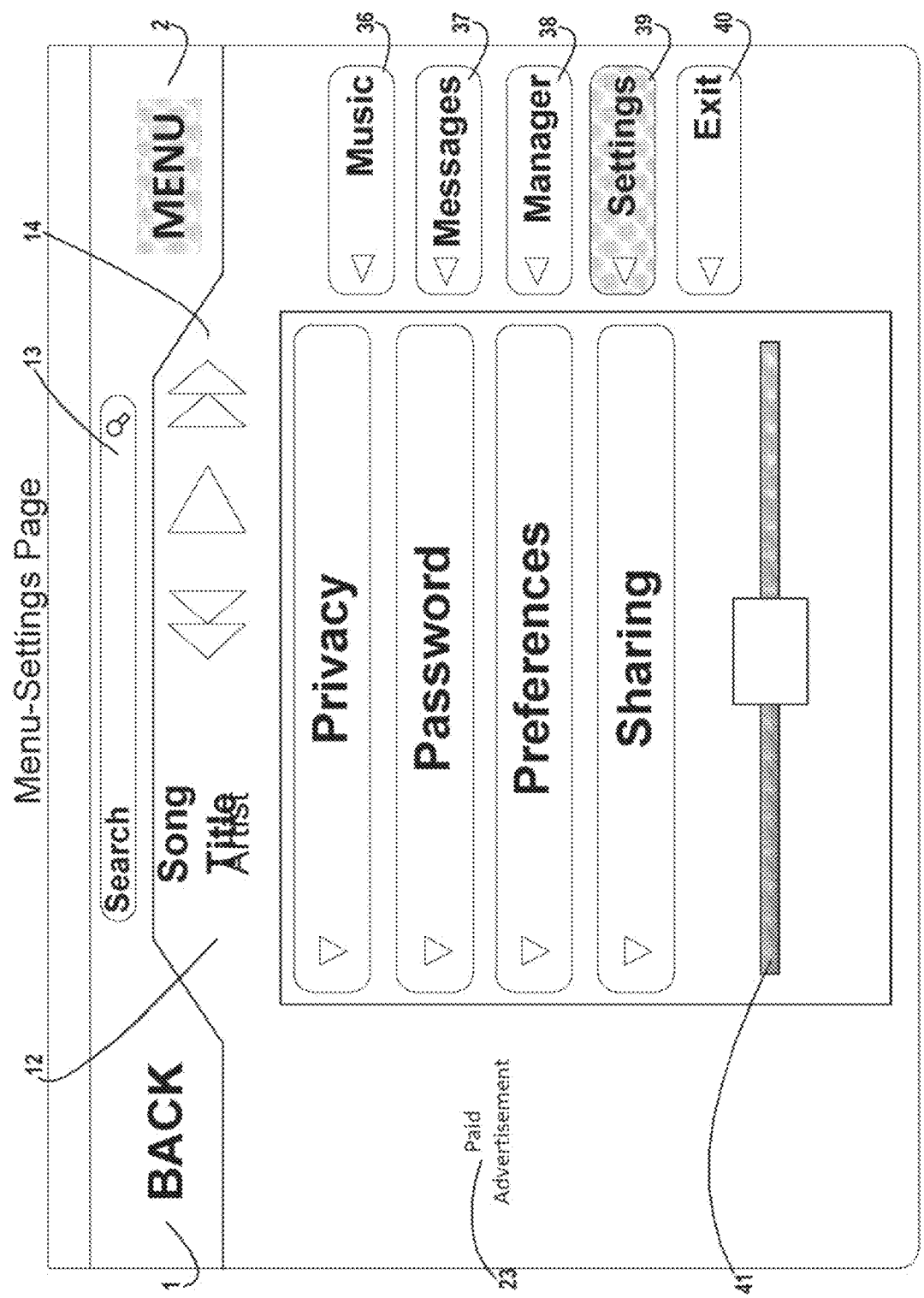

FIG. 6 is an exemplary user interface for user settings, in accordance with embodiments of the present invention.

Figure 7:
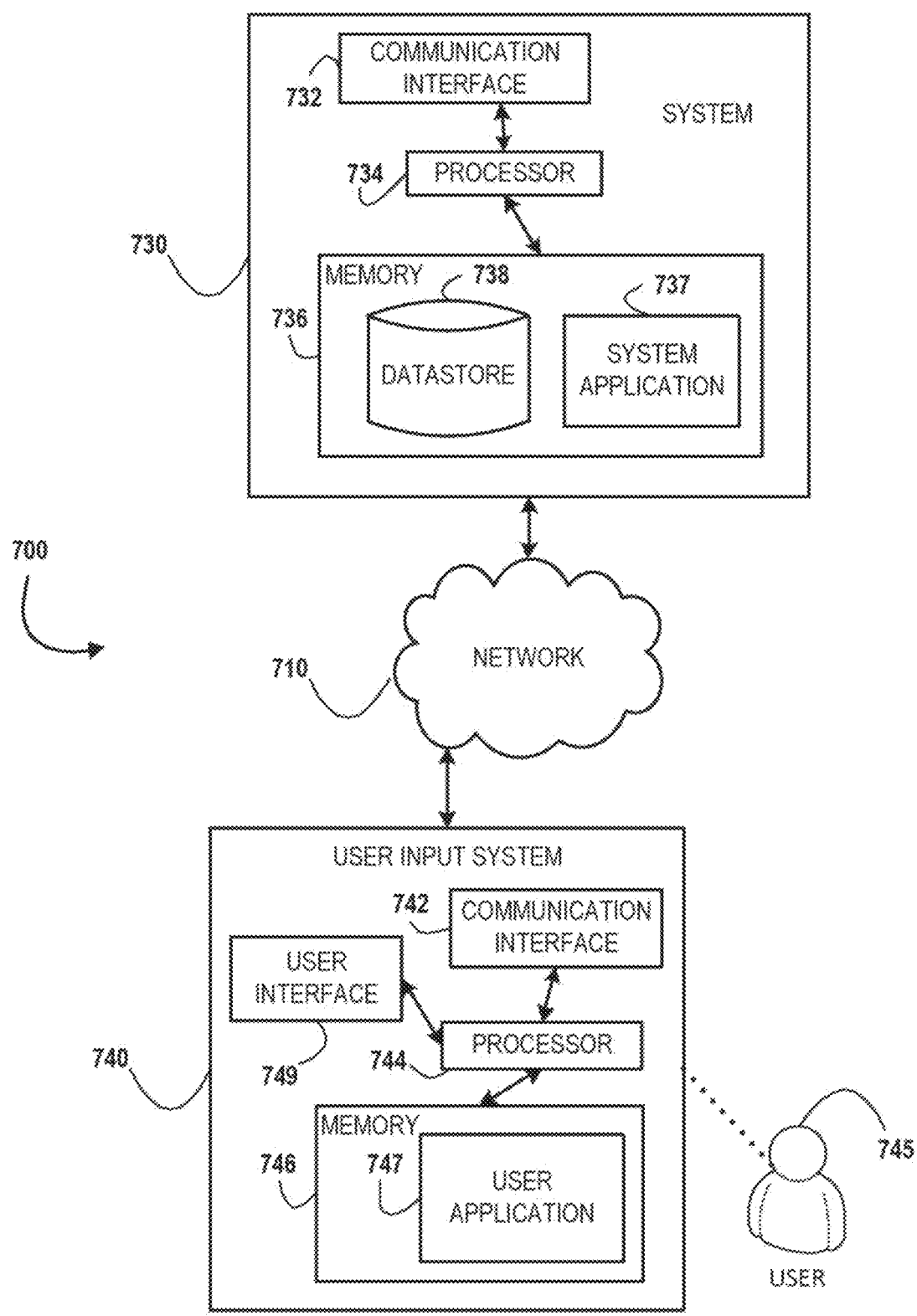

FIG. 7 is an exemplary system diagram of a computing environment, in accordance with embodiments of the present invention.

Figure 8:
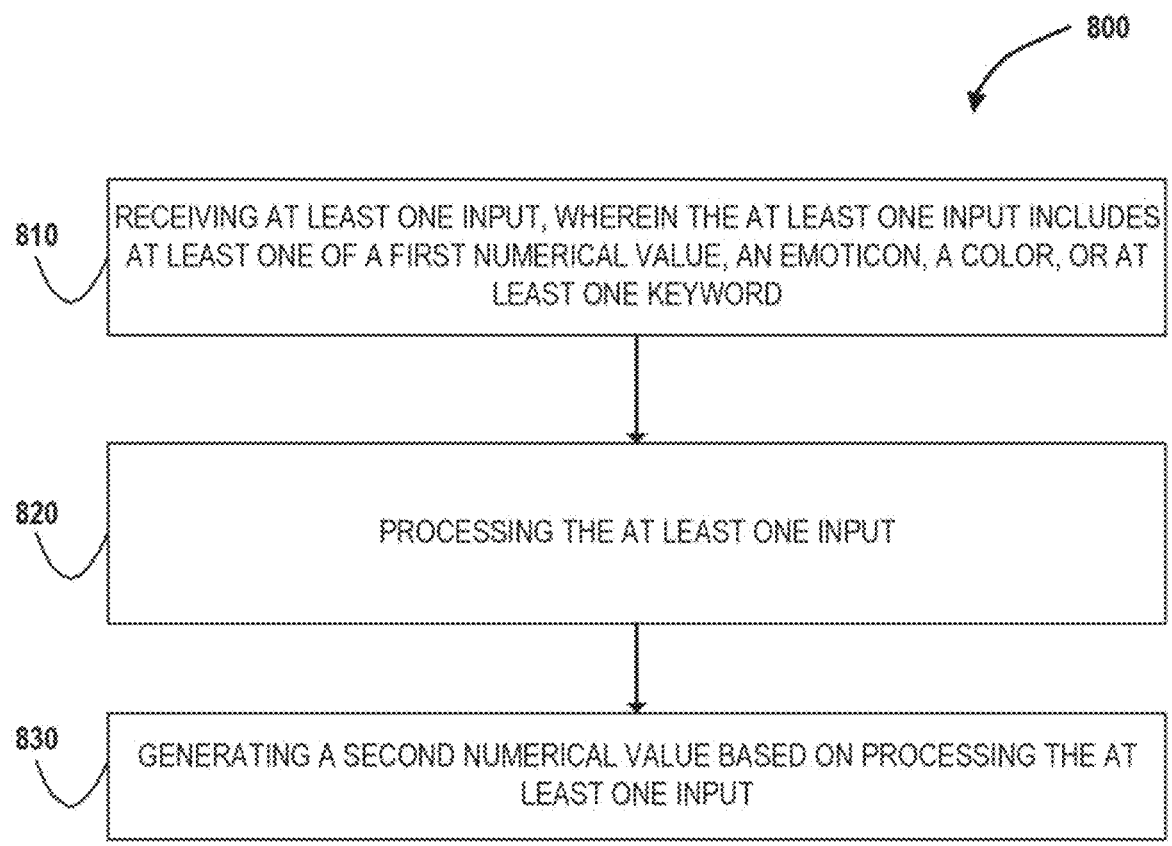

FIG. 8 is an exemplary process flow for generating a rating score based on a variety of inputs, in accordance with embodiments of the present invention.

Figure 9A:
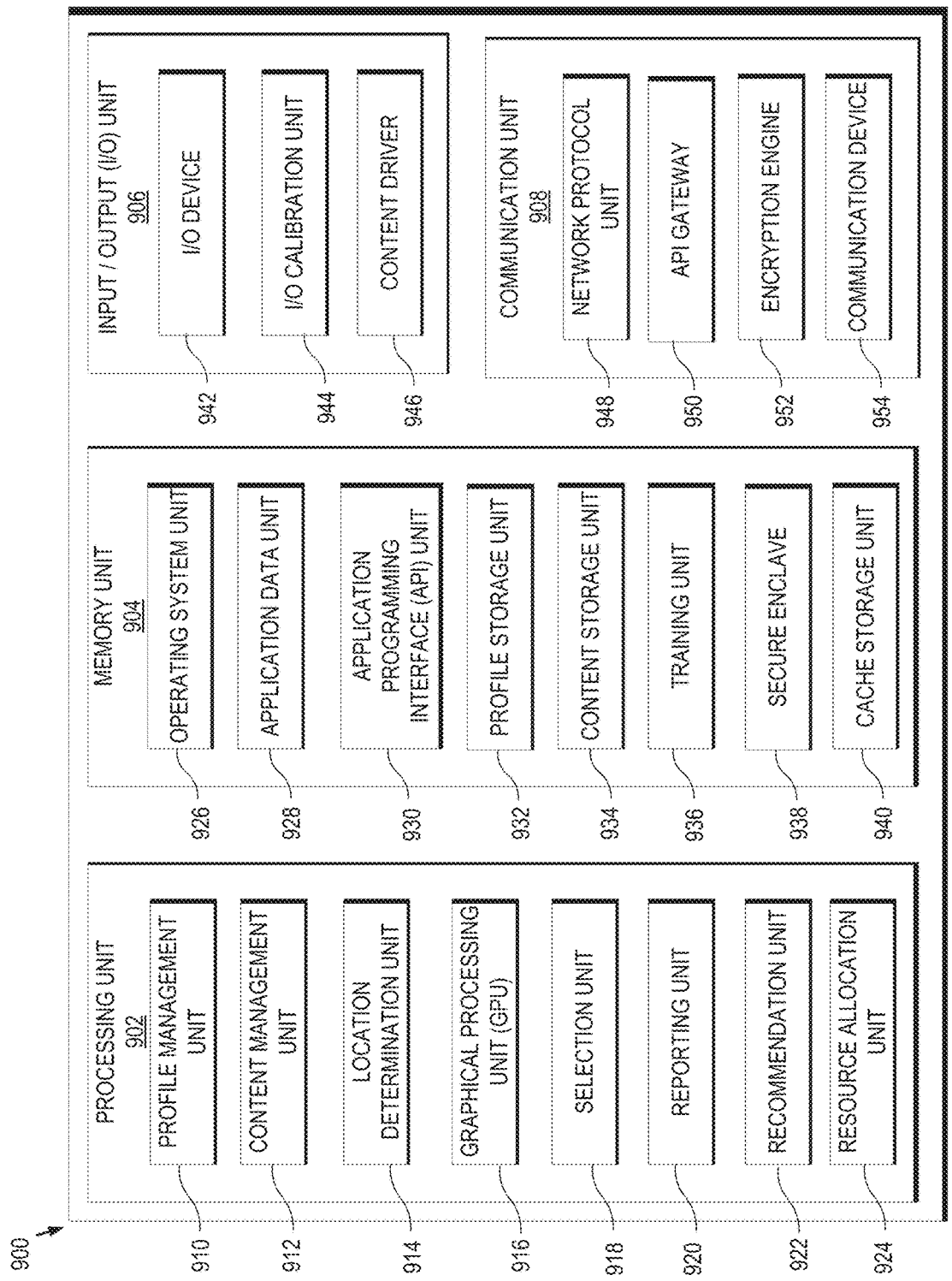

FIG. 9A is an exemplary computing environment, in accordance with embodiments of the present invention.

Figure 9B:
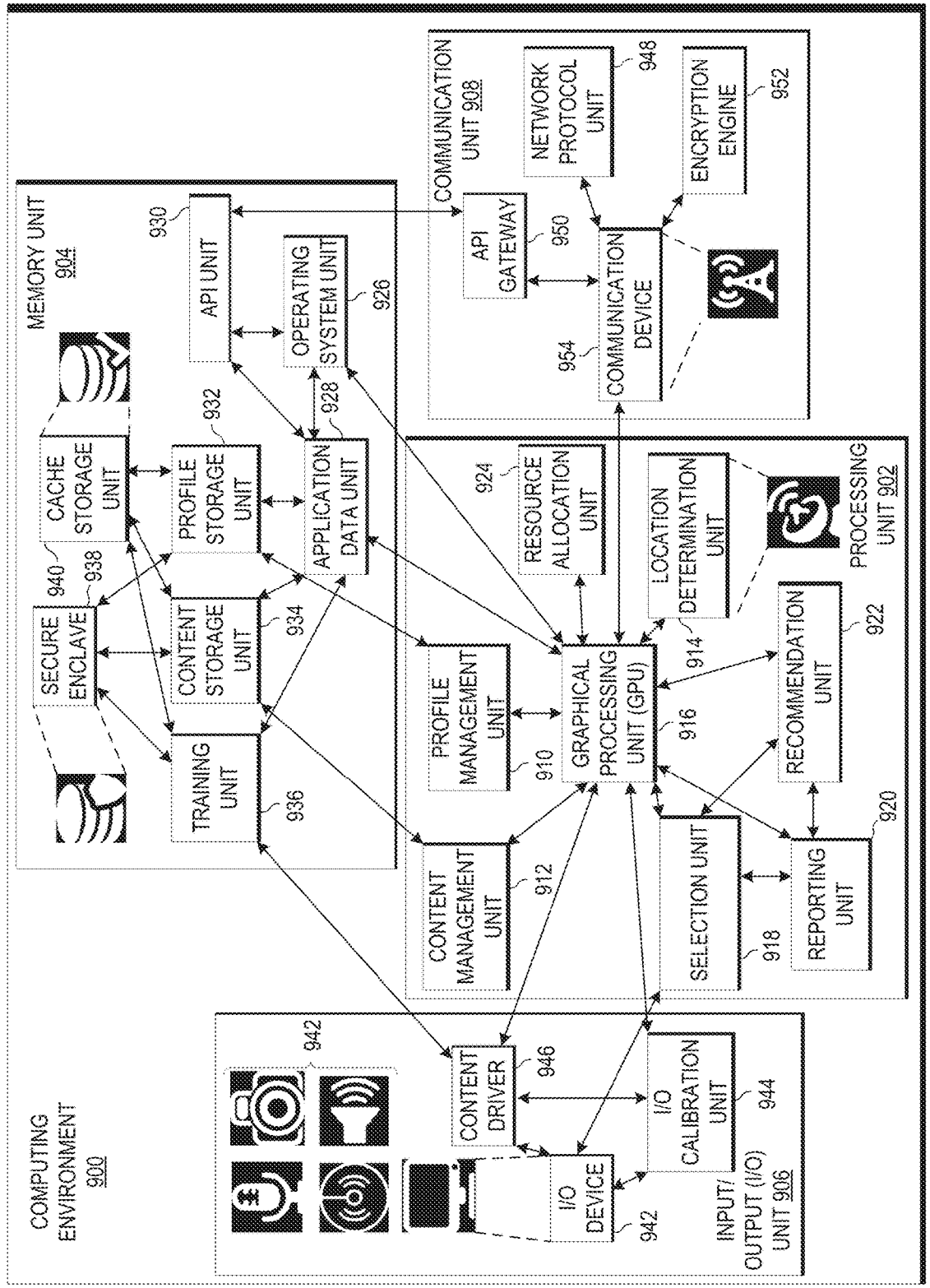

FIG. 9B is an exemplary connectivity diagram of the computing environment in FIG. 9A, in accordance with embodiments of the present invention.

Figure 10A:
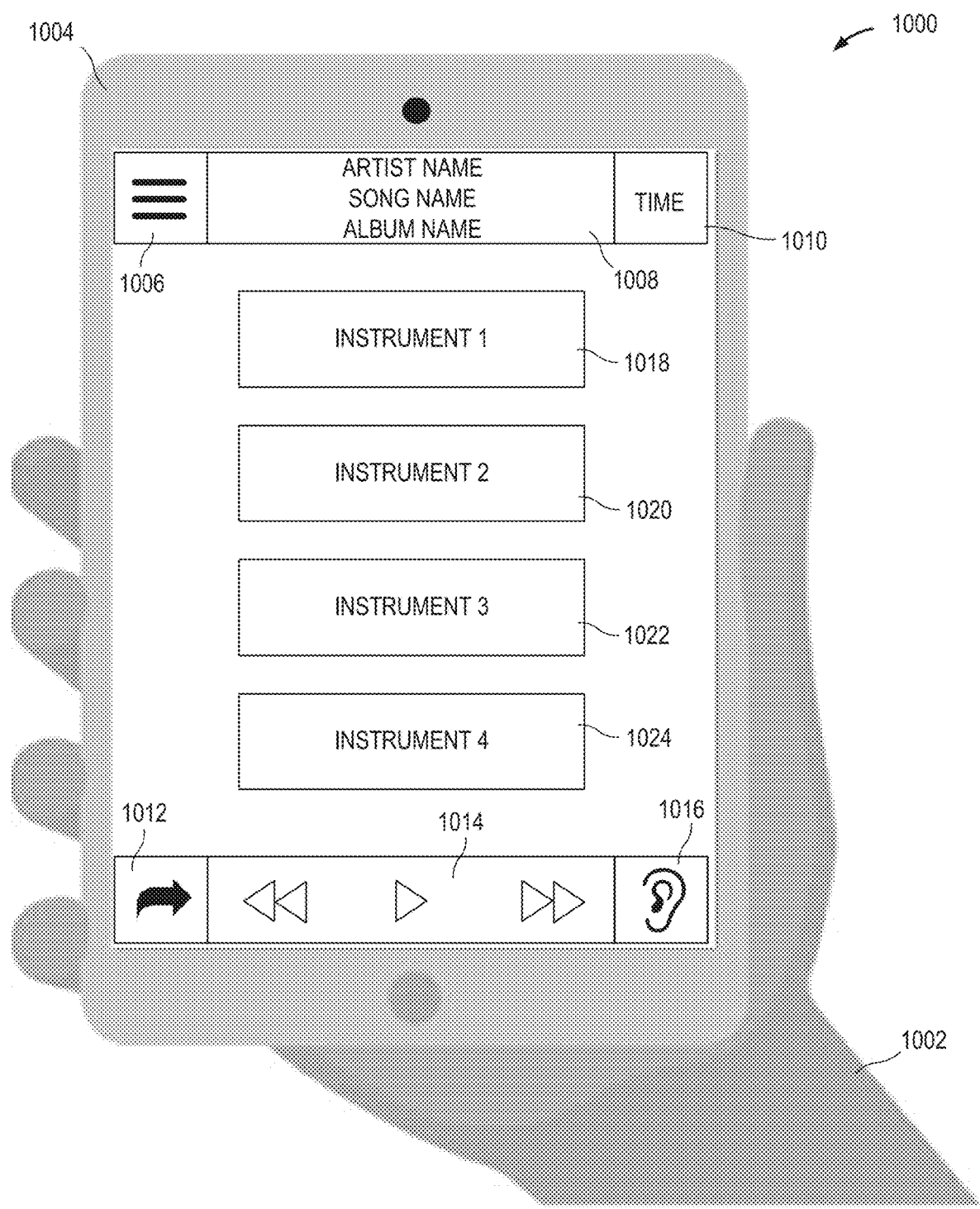

FIG. 10A is an exemplary feedback interface with selectable buttons, in accordance with embodiments of the present invention.

Figure 10B:
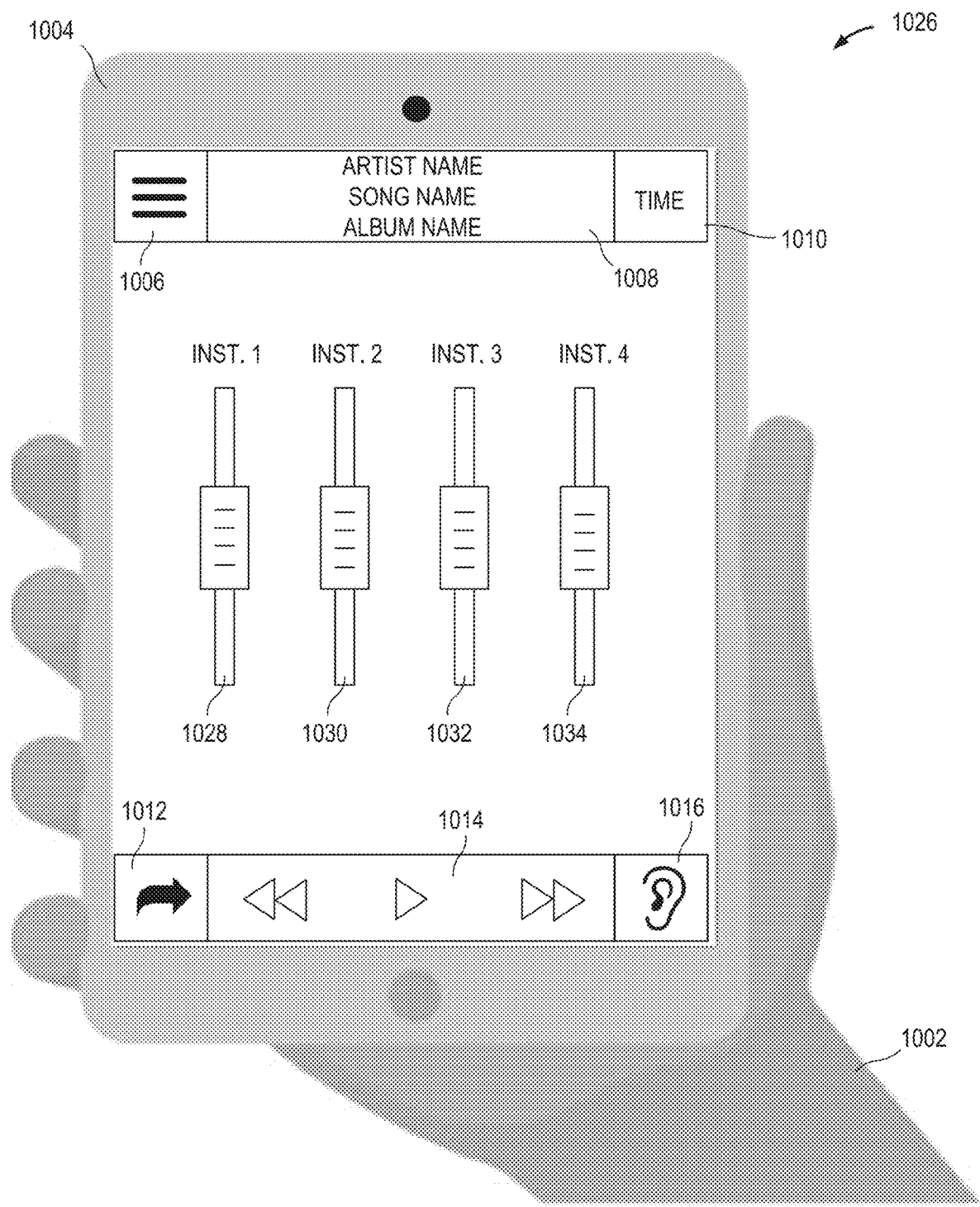

FIG. 10B is an exemplary feedback interface with sliders, in accordance with embodiments of the present invention.

Figure 10C:
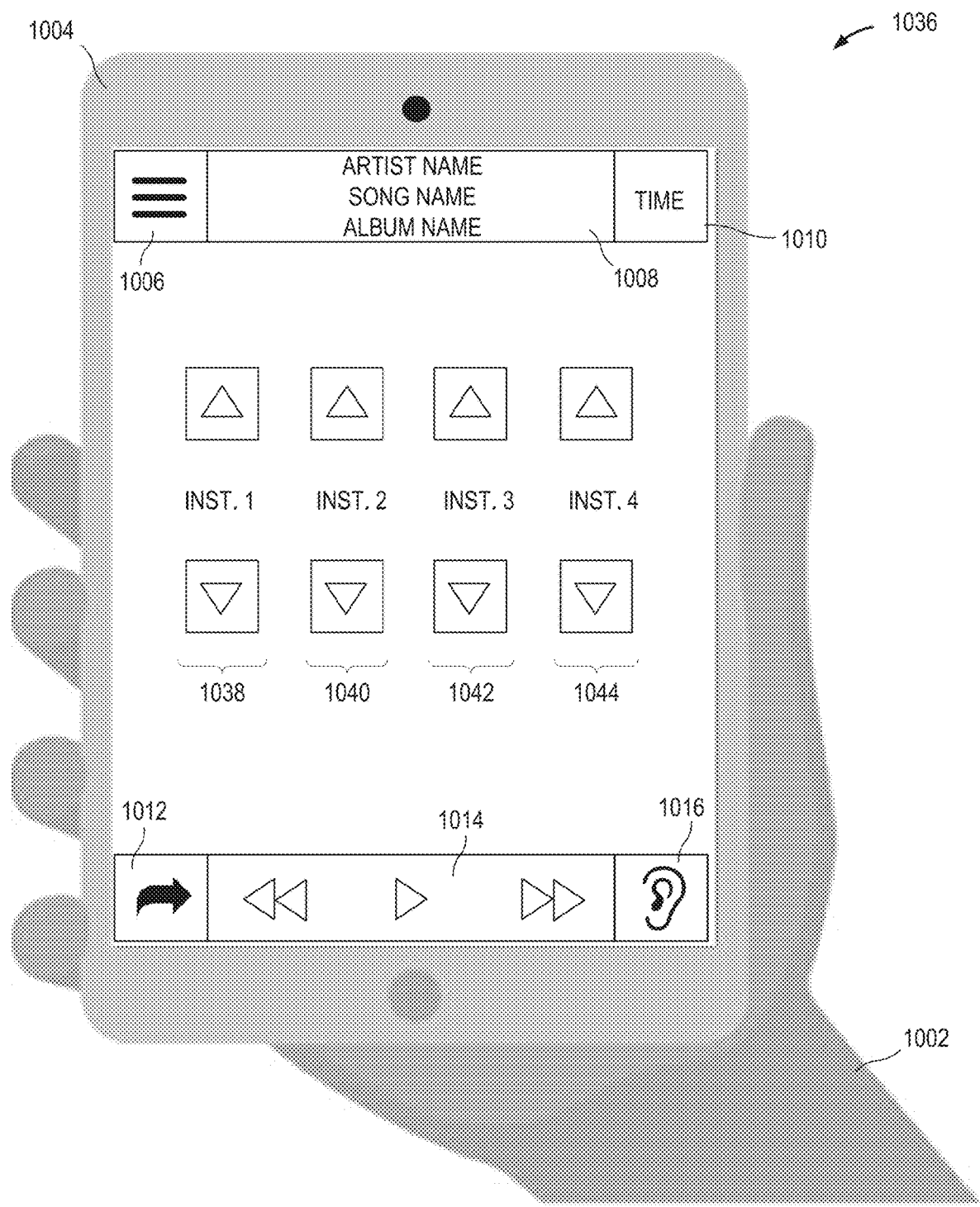

FIG. 10C is an exemplary feedback interface with up and down buttons, in accordance with embodiments of the present invention.

Figure 10D:
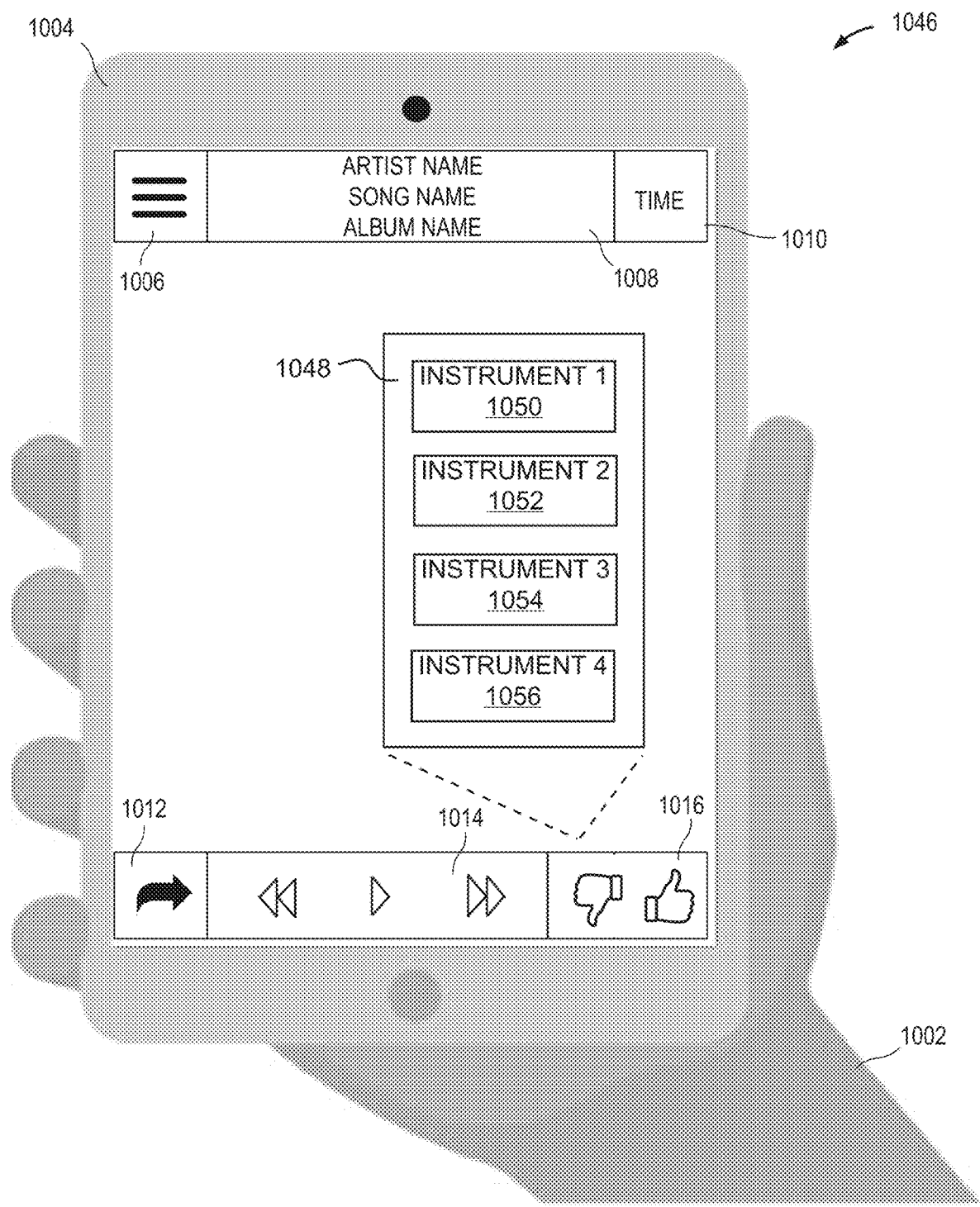

FIG. 10D is an exemplary feedback interface with a pop-up menu, in accordance with embodiments of the present invention.

Figure 10E:
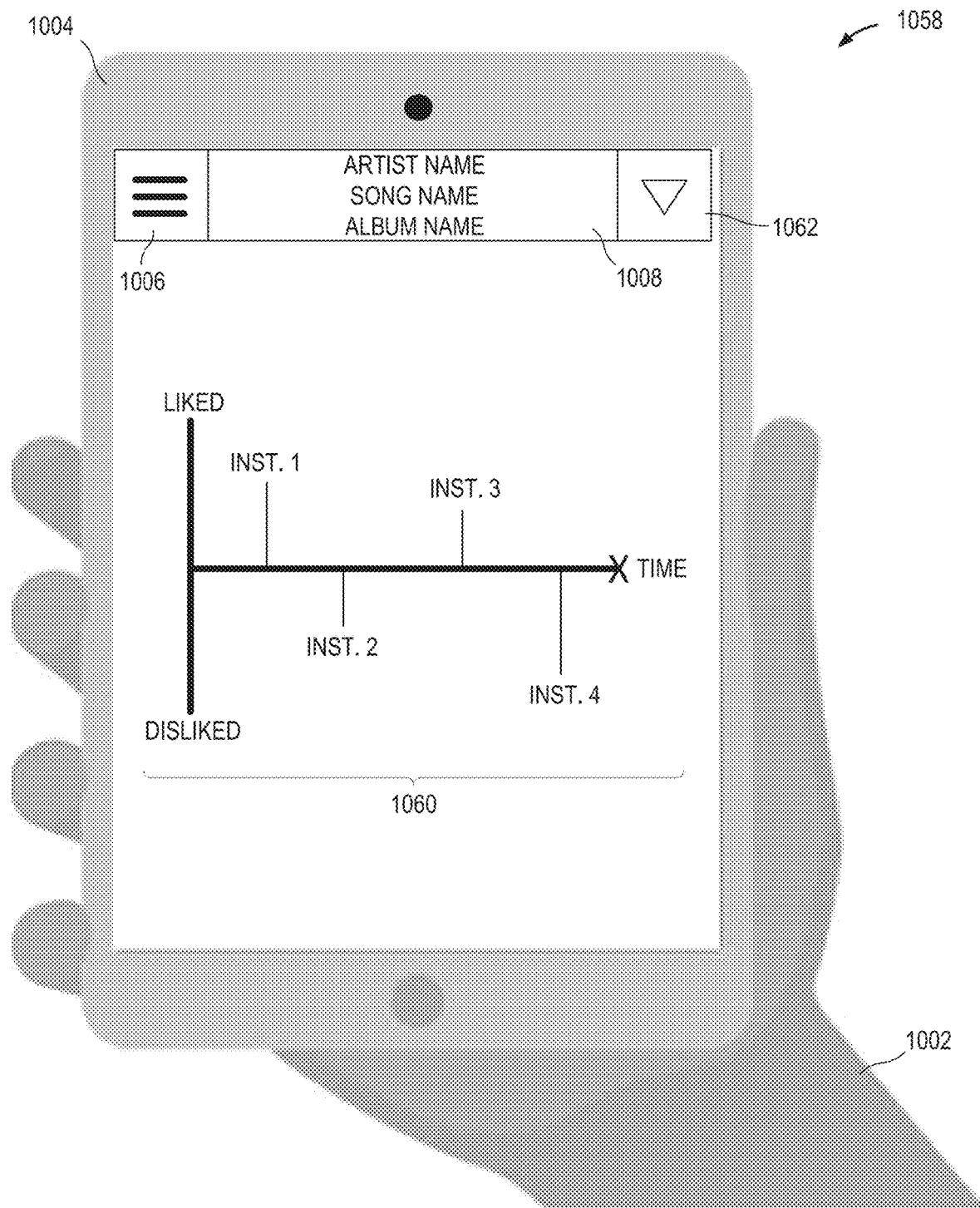

FIG. 10E is an exemplary user interface displaying feedback received during playback of a song, in accordance with embodiments of the present invention.

Figure 10F:
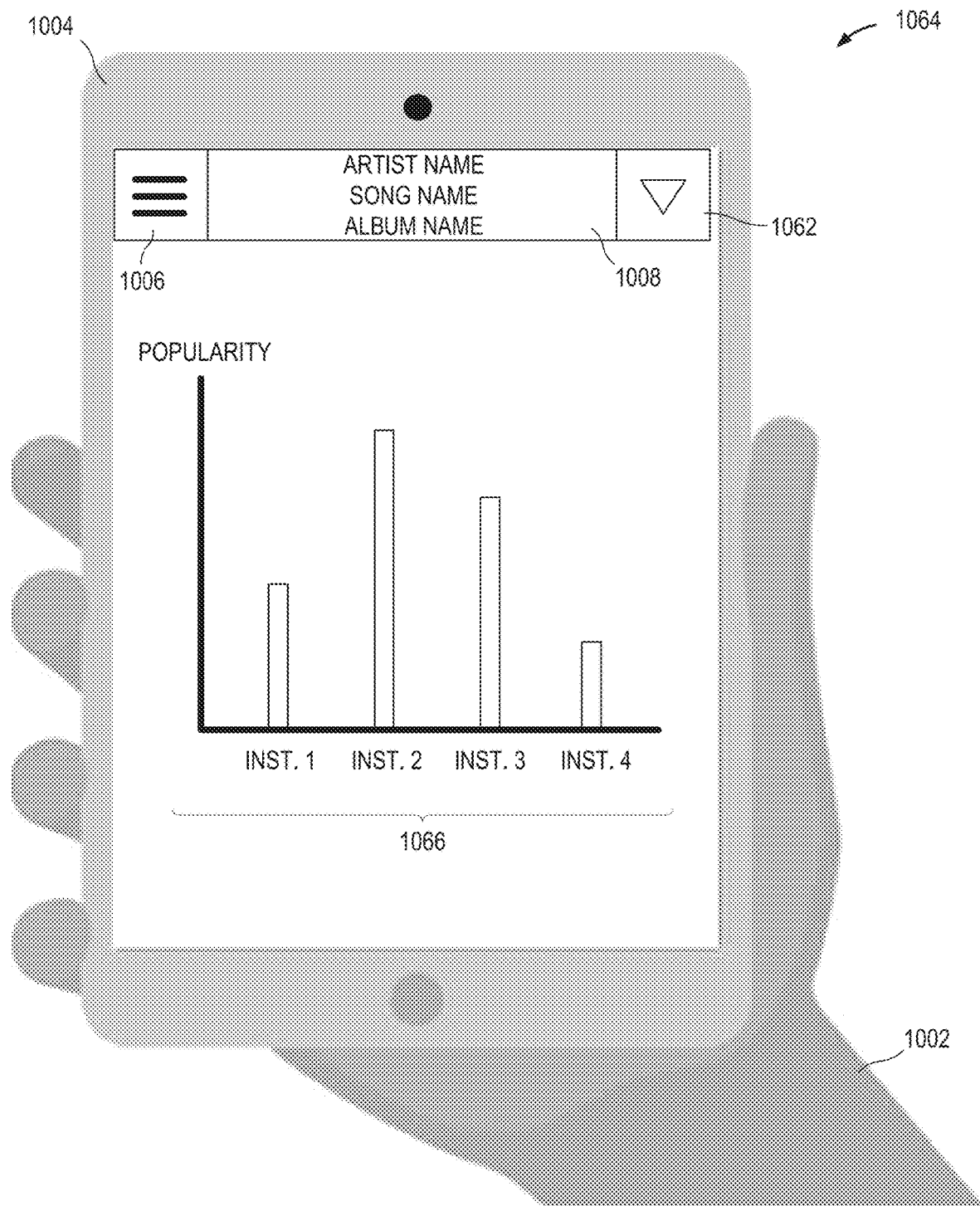

FIG. 10F is an exemplary user interface displaying popularity results, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As used herein, a "user" may refer to a "first user," a "second user," and/or the like. The first user refers to a songwriter, an artist, a musician, a producer, a director, a cinematographer, a photographer, a musical performer, an engineer, a product designer, a marketer, and/or the like. The second user refers to a listener, an audience member, a family member, a friend, a fan, a second musician, a focus group participant, a band mate, a second songwriter, a second producer, a second director, a second musical performer, a second engineer, and/or the like. These user terms may be used interchangeably.

The present invention is directed to a software-based tool (e.g., an application) that enables the first user to collect feedback from one or more second users in regards to a work of art (e.g., a piece of music, a song, an audio clip, a live performance, a comedy skit, a video, a speech, a movie, a picture, an image, a physical product, a virtual product, an item, a website, a design, a social media post, an article, a meme, a game, a book, a product demonstration, a prototype, a dating profile, a social media profile, media content, an instrument, and/or another type of content). The term "work of art" may be used interchangeably throughout with any (or multiple) of the examples provided herein; in fact, each example of a work of art may refer to and/or include one another. In some embodiments, the application may be further configured to generate a unique rating score (e.g., a numerical value) based on processing the collected feedback. The rating score may serve as a numerical benchmark for overall quality and/or comparison of multiple works of art. One or more individual elements of the work of art may also receive rating scores in addition and/or alternative to an overall rating score.

As shown in FIG. 1, the first user may be enabled via an interface (e.g., a form) to upload the work of art (e.g., an audio content file) to a server location accessible by the first user and/or one or more second users. A "Back" 1 button and a "Menu" 2 button may enable the user to navigate between pages of the interface. In some embodiments, the user may attach a file by selecting the "Browse" 3 button. The system may launch a window that enables the first user to select a file from a storage location such as a desktop, a folder, a hard drive, and/or the like. In some embodiments, the work of art is uploaded onto a dedicated server, a cloud-based server, and/or another storage device. In other embodiments, the first user may be enabled to provide a hyperlink, a URL, a pointer, and/or another reference to the work of art if the work of art is already uploaded to an Internet-enabled server and/or otherwise accessible to the interactive music feedback system described herein. To do so, the user may provide a URL and/or a link to the file by selecting the "Enter URL" 4 button. For example, the first user may wish to link to a piece of music that has already been uploaded to the Internet, a website, a storage device (e.g., a server, a hot spot, a mobile device, or the like), a social media network, a music streaming service, a content platform, and/or the like. The work of art may be accessed by the system and made available to the first user and/or the one or more second users via the World Wide Web, the Internet, an application, an operating system, and/or any other type of communication connection. In some embodiments, the work of art may be a physical item, and therefore uploading the work of art to a computer is not possible. Simply a reference, a label, and/or other markers may identify the work of art.

After the first user uploads or provides a link to the work of art, the first user is enabled to input information 5 associated with the work of art. Information associated with the work of art may include a title, an artist name, a producer name, a picture or photo, a length or duration associated with the work of art, a time, date, and/or location of a performance, a version number, lyrics, discography information, a genre, an album name, a biography, notes, and/or the like. Additional notes may be entered via the "Text Entry Box" 6. In some embodiments, the system may automatically fill in at least one piece of information 5. In other embodiments, manual entry of information 5 may be utilized, or a combination of manual and automatic entry.

After entering information 5 associated with the piece of music, the first user may be enabled to select, identify, denote, indicate, and/or otherwise input at least one rating criterion by selecting at least one of the "Criterion" 7 buttons and/or by other means. In some embodiments, the at least one rating criterion may be associated with and/or include an instrument in the piece of music, the mix of the piece of music, an aspect of a product, or the like. The at least one rating criterion may direct the second user(s) to rate certain aspects of the piece of music. In some embodiments, the at least one rating criterion may be manually inputted by the first user. In other embodiments, the at least one rating criterion may be automatically determined by the system.

For example, the system may automatically determine which instruments are present in an arrangement of a piece of music and thus automatically include each instrument as a rating criterion.

In some embodiments, the first user may create a custom rating criterion. This may enable the first user to select exactly on which aspect of a piece of music he wishes to receive feedback. More particularly, the first user may also be enabled to input elements (e.g., rating criteria, one or more characteristics, aspects of the work of art, and/or the like) on which the first user wishes to receive feedback. For example, in the context of music rating, an element may include an instrument of a song, a voice, a song section (e.g., intro, verse, prechorus, chorus, bridge, and/or the like), a tempo, a beat, a vibe, a feel, a groove, dynamics, an artist, a genre, an album, lyrics, effects, profanity, subject matter, and/or the like. As another example, the first user may select "brightness," "contrast," clarity," and/or "color" as criteria associated with a picture or video to be reviewed by the second user. In this manner, the first user is enabled to specify custom criteria. For example, the first user may input and/or select three instruments' names featured in a song on which he wishes to receive feedback. In some embodiments, the first user may be enabled to select criteria from a list of predetermined, popular, and/or most-used criteria. In some embodiments, the first user may be enabled to select elements from a limited set of options based on a first account status (e.g., a limited account status). Upon achieving a second account status (e.g., an unlimited account status), the first user may be enabled to select from a broader set of element options and/or to input custom elements. In some embodiments, specifying a custom criteria may cause a device described herein to assign an instrument, an instrument name, an icon, an image, a value, and/or another indication associated with an instrument to an interface portion, a button, and/or other interface element that is used by the second user to indicate a like and/or dislike with respect to audio content.

The terms element, instrument, and/or rating criterion may be used interchangeably throughout. An element may refer to and/or include an instrument, an instrument may refer to and/or include an element, an element may refer to and/or include a rating criterion, a rating criterion may refer to and/or include an element, an instrument may refer to and/or include a rating criterion, a rating criterion may refer to and/or include an instrument, and so on. As such, an instrument may also include a voice, vocals, a guitar, an acoustic guitar, an electric guitar, a lead guitar, a rhythm guitar, a drum, a drum set, an electronic drum set, an acoustic drum set, a cymbal, a gong, a piano, a keyboard, a harpsichord, a synthesizer, a bass guitar, an electric bass guitar, an acoustic bass guitar, an upright bass, a stringed instrument, a woodwind instrument, a brass instrument, a percussion instrument, and/or any other instrument. An instrument may also include to a song section, dynamics, a tempo, a beat, a feel, a groove, a vibe, lyrics, effects, a pitch, sharp, flat, a rhythm, a harmony, and/or the like. An instrument may also include a song name, an artist name, a genre name, an album name, media content, audio content, video content, and/or the like. An instrument may also refer to an equalizer, a compressor, a preamplifier, a microphone, converters, wireless microphone units, wireless monitoring units, cables, power amplifiers, monitors, speakers, speaker cabinets, effects units, effects processors, pedals, power supplies, and/or any piece of gear used in music production. An instrument may also refer to a microphone placement, a mix of one or more audio tracks, an arrangement, and/or any other music production technique.

Multiple instruments may be present in an arrangement of a song. Each instrument in a song may be associated with one or more audio tracks that make up the song. As such, a song may comprise one or more audio tracks, where each audio track is associated with one or more instruments. In some embodiments, multiple instruments may be included and/or otherwise present in a single audio track. In some embodiments, one instrument may correspond to multiple audio tracks. A song may include audio content, and/or vice versa.

In the context of comedy, elements to be reviewed may include timing, delivery, audience response, an accent, a joke, a story, an impersonation, stage presence, eye contact, appearance, style, clothes, accessories, audio quality, a laugh, and/or the like. A second user could provide feedback as to which jokes he likes and dislikes, and then communicate why using the feedback interface.

In some embodiments, an image and/or profile of a person, artist, and/or the like may be reviewed. For example, the interactive feedback system described herein may be used in the context of a mobile dating application. When a user of a mobile dating application views another's profile, which may include an image of a person, a name, a description, and/or other personal information, the user may review the profile to determine whether he/she would like to communicate further with that person. As such, the tool described herein may enable the user to provide feedback about what he/she likes and/or dislikes about the other person. For example, the user may be enabled to denote that he/she is attracted to someone's height, age, hobbies and/or the like. Elements to be reviewed may include a name, an age, a location, a description, a caption, an image, appearance, personality, a face, a face shape, a nose, eyes, ears, a chin, hair, hair style, hair color, hair length, skin color, skin clarity, a tattoo, a piercing, body art, an accessory, a body part, a body shape, a hobby, an interest, a skill, a profession, a school, a religion, a race, an ethnicity, a gender, a sexual orientation, and/or the like.

As an illustrative example, consider a mobile dating application in which users are presented with others' dating profiles and either "swipe left" to reject the profile or "swipe right" in hopes of continuing communication. After swiping, the user could, using the interactive feedback system described herein, communicate which elements of the person's dating profile he/she found attractive and/or unattractive. This data could then be presented to the person associated with the dating profile so that he/she could improve his/her odds at attracting a mate.

The interface further enables the first user to input and/or select recipients (e.g., one or more second users) who will review and provide feedback on the work of art (e.g., song and/or other media content). Recipients may be denoted by an email address, a username, a name, a phone number, an account, a profile, and/or the like and may be selected from a list of contacts or manually inputted. For example, the first user may select a recipient from a list of contacts via the "Select Contacts" 8 button, emails via the "Enter Emails" 9 button, or the like. The application described herein may be configured to access a first user's stored contacts, social media connections, and/or the like.

In some embodiments, the first user may create a private party and/or a closed group of recipients (e.g., second users) that is exclusive to the selected recipients to ensure privacy of the audio content. The first user may also select target demographics, groups of listeners (e.g., second users), and/or specific audiences that he/she wishes to review the work of art. In some embodiments, the first user may choose to make the response system available to the general public, a random group of second users, and/or the like.

The "Comments/Instructions" 10 box may enable the first user to provide the second user with exact instructions of which elements of the work of art is to be reviewed. For example, the first user may be enabled via the application to input text, emoticons, notes, direction, and/or the like to provide comments, messages, and/or instructions to the recipients for completing the feedback process. The message may be accessible to the general public or accessible only to a private predetermined party (e.g., recipients only).

After the first user completes the form for uploading the work of art, the first user may select the "Upload & Send" 11 button. When the user selects the "Upload & Send" 11 button, a file associated with the work of art (e.g., a media file, an audio file, and/or the like) may be transmitted from a user device associated with the first user to a server, a database, and/or the like associated with the interactive music feedback system described herein. In some embodiments, the system may automatically create a database entry, enter into a database any information associated with the file (e.g., bibliographic information, review instructions, identifiers of elements to be reviewed, and/or the like), and save the information as well as the media file. In some embodiments, if the media content is already hosted online and a link to a the media content was provided, the system may simply store the provided URL and/or other pointer in lieu of storing the media file itself. The system may also create a database entry for feedback associated with the work of art and/or partition a predetermined amount of computing resources. Database entries for the media file, information associated with the media file, and/or listener feedback may be associated with one or more of each other in the database.

Additionally, the system may transmit one or more of the media content, a link to the media content, a message and/or review instructions, and/or a feedback interface to a user device (mobile device, computer, laptop, tablet, and/or the like) associated with each selected recipient (e.g., second user). In some embodiments, these items may be delivered via an internal messaging system native to the application associated with the interactive music feedback system. In some embodiments, these items may be delivered via email, a text message, a social media post, an SMS message, a notification, a music streaming application, a media content platform, and/or any other method or platform of communication.

For example, the system may transmit a message (e.g., a notification, alert, email, text message, and/or the like) to the recipients (e.g., second users). The message may include the work of art and/or means for consuming the work of art (e.g., a video player, a music player, an image or photograph, various control interface for the same, and/or the like). In some embodiments, the media content and/or the media player that is to be reviewed by the second user may be embedded in the message, and/or vice versa. Additionally and/or alternatively, the message may include a link to the work of art, a user interface that enables the second user to provide feedback in regards to the work of art, and/or any information associated with the work of art (e.g., a list of included input criteria, comments, instructions, and/or the like). As described in more detail below, the message may be transmitted via any network such as the Internet, a radio network, a Bluetooth network, a fiber optic network, a wireless network, and/or the like.

This transmittal process may also be accomplished in other ways, such as utilizing an attachment button and/or a send button in an email application, a messaging system, a website, a social media network, a music streaming platform, a radio station, and/or the like.

As described in more detail below, a second user may receive the media content and/or a feedback interface that enables him/her to consume the media content and/or provide feedback on the media content, respectively. More specifically, the media content, feedback interface, and/or accompanying information may be received at a user device of one or more second users. The message (e.g., the media content, feedback interface, accompanying information, and/or an invitation to review a work of art) may be accessible by second user (or other recipients) on a mobile device, a tablet, a laptop computer, a desktop computer, a wearable computing device, and/or another computing device.

Once the media content is received, the second user may experience (e.g., consume, watch, listen, look, examine, feel, touch, taste, and/or the like) and review the work of art. In some embodiments, the media content may be consumed via an interface that includes a media player. For example, the interface may include at least one of (and/or a combination of) a video player, a music player, a media player, a photograph or picture, text, comments, instructions, a description, information associated with the work of art, a list and/or array of selectable rating criteria, various input means for providing feedback (e.g., a slider, a button, a text field, a selection menu, and/or the like), and/or the like. The interface (including the feedback interface contemplated herein) may integrate with a third party content provider platform as well, such as a music streaming platform or video platform. In some embodiments, media content may be comprised in the interface. In some embodiments, information associated with the media content and/or an advertisement may be embedded within the media content and/or another element of the interface. In some embodiments, second users may simply follow a hyperlink to a website that hosts the media content in order to review the media content.

FIG. 2 illustrates an exemplary user interface for a Home Page of the response system described herein. This Home Page may be presented to the second user upon logging into an online portal, opening an application, and/or the like associated with the interactive music feedback system. The Home Page may enable the first user and/or the second user to listen, share, and/or interact with a piece of music and/or other media content. Information 5 associated with a piece of music (e.g., work of art) may be displayed in a banner 12. Selecting the banner 12 may display a more detailed report of an artist profile. As used herein, an artist may refer to a first user, a second user, and/or the like. A search bar 13 may enable the first user and/or the second user to quickly find a piece of music, an album, a musician, information, and/or the like. Player controls 14 may provide the first user and/or the second user with control over which piece of music is playing. For example, the player controls 14 may enable a user to play, pause, start, stop, rewind, seek, skip forward, skip backward, shuffle, repeat, next, previous, random, move to another page and/or image, and/or the like.

The first user and/or the second user may also be enabled to add a piece of music to a playlist, an album, a favorites folder, and/or the like via the "Add" 15 button. The first user and/or the second user may rate a piece of music by selecting the "Rate" 16 button. The first user and/or the second user may share a piece of music on a social networking site, a text message, an email, an SMS message, an internal messaging system, and/or any other communication method via the "Share" 17 button. The first user and/or the second user may learn more information about the piece of music by selecting the "Info" 18 button. For example, the information 5 associated with the work of art may be displayed upon selection of the "Info" 8 button. A seek bar 19, a shuffle feature 20, and/or a loop feature 21 may provide the first user and/or the second user with further control of their listening experiences. An album art image 22 may also be displayed. Selecting the album art image 22 may enable a zooming feature. A paid advertisement 23 and/or a random advertisement 24 may be featured throughout the interfaces. The first user may be enabled to purchase and/or manage advertising spots, features, and/or the like throughout the application.

Selecting the "Rate" 16 button may present a feedback interface to the user as seen in FIG. 3, FIGS. 10A-10D, and/or in another configuration. For example, while a piece of music is playing, the second user may select the "Rate" 16 button from the Home Page to make note of what he likes or dislikes in the piece of music. When the "Rate" 16 button is selected as depicted in FIG. 3, the system may store the point in time with a timestamp, a date, a time, and/or the like at which the "Rate" 16 button was selected. This enables the system to inform the first user exactly when something caught the second user's attention in the piece of music. In some embodiments, the point in time may be identified using an API and/or another data reference associated with a media player. Specifically, the system may identify an elapsed time, a time remaining, a current time, a clock time, and/or another time to determine at which point in time the second user wanted to indicate a like and/or a dislike with respect to media content (and/or an element of media content). The system may identify and/or process one or more time values to determine and/or calculate the point in time at which feedback is received with reference to playback of media content.

In some embodiments, the "Rate" 16 button may be integrated into a media player in another fashion. For example, the "Rate" 16 button may include a "thumbs up" button and/or a "thumbs down" button. In some embodiments, one or more "Rate" 16 buttons may be integrated into a third-party media player, such as an audio streaming application, an online dating application, and/or the like. In some embodiments, the second user may not need to select any button to access a feedback interface. The system may automatically provide users with a feedback interface upon initiation of an application and/or playback of media content.

As the second user reviews the work of art, he may be enabled to provide feedback on the work of art via the feedback interface. In some embodiments, the second user may respond to questions, comments, and/or instructions provided by the first user. In some embodiments, the second user may respond to the rating criteria designated by the first user. For example, the second user may be instructed to review a particular element and/or aspect of a song. As another example, the second user may listen to a song, using the feedback interface to indicate what he/she likes and/or dislikes about the song, such an instrument and/or another element. The second user may interact with a variety of input means, including but not limited to a text field, an input slider, a button, a tab, a color selection, an emoticon selection, a selection menu, a camera, a microphone, a biometric input, and/or the like. In some embodiments, the second user may be enabled to create and/or respond using custom rating criteria, and/or otherwise choose his/her own method of communicating his/her opinion about the work of art.

In some embodiments, the second user may be enabled to rank one or more rating criteria based on the second user's response to each rating criterion. For example, the second user may be instructed to rank several instruments in an arrangement of a song from favorite to least favorite. This information may communicate to the first user which instrument is most critical to the song's success, which instrument needs the most improvement, and/or the like. In some embodiments, the user may be enabled to input individual rating criteria, select rating criteria from a list, sort rating criteria in a menu, and/or otherwise create a ranked list.

Each rating criterion (e.g., instrument, element, and/or the like) may be associated with one or more portions of the feedback interface. For example, a portion of the feedback interface may include a button, a slider, an interface portion in which gestures such as taps, slides, swipes, holds, flicks, drags, zooms, swims, drawings, and/or other gestures may be identified, and/or the like. In some embodiments, an interface portion may include a selectable portion in the sense that upon selection of an interface portion (e.g., selection of a button, a drag of a button, a hold of a button, a hold and/or drag of a slider to a particular location on the interface, a gesture, and/or the like), an action is initiated and/or recorded by the application. Any action contemplated herein may correspond to selection of any interface portion. Each interface portion of the feedback interface may be associated with one or more rating criteria. Multiple interface portions may be associated with the same rating criterion and/or each interface portion may be associated with a different rating criterion. Interface portions may be included on the feedback interface, a third party media player, a dating application, a music streaming control bar, pop-up windows, menus, and/or any other user interface. One or more interface portions may be included in any other interface portion. In some embodiments, an interface portion may include and/or otherwise refer to an instrument button. Similarly, an instrument button may include and/or otherwise refer to an interface portion.

The interface portions of the feedback interface may be arranged in any manner on the feedback interface. In some embodiments, interface portions may be arranged as an array of selectable icons, buttons, sliders, text, images, and/or the like. In some embodiments, interface portions may be arranged as an list of selectable icons, buttons, sliders, text, images, and/or the like. For example, a menu displaying various options for responses to a work of art may include one or more interface portions, where each interface portion corresponds to an option for providing feedback. These options may be selected using a variety of input means, such as clicking using a pointer and/or a mouse, selecting using a controller, selecting, tapping, and/or gesturing on a touch-screen, gesturing in front of a camera, biometric scans, and/or the like.

The second user may be enabled to input different types of information. For example, the second user may be enabled to input text or comments associated with the work of art as a whole or a specific rating criterion. In some embodiments, the second user may be enabled to select a color. In some embodiments, the second user may be enabled to select a numerical value associated with the work of art as a whole or a specific rating criterion. In some embodiments, the second user may be enabled to input and/or select emoticons. In some embodiments, the second user may be enabled to select one or more interface portions associated with rating criteria to indicate whether he/she likes and/or dislikes a specific aspect of a work of art. In some embodiments, the user may be enabled to make gestures in front of a camera, which detects gestures made in response to viewing the work of art.

The inputted text or comments may provide information to the first user of what exactly the second user likes or dislikes about the work of art as a whole and/or with respect to a specific rating criterion. The system may be configured to analyze inputted text and/or comments provided by second users to identify, extract, and/or process keywords that are associated with particular positive, negative, or neutral emotions. For example, if a second user inputs "AWESOME!!," then the system may determine that the inputted comment is positive. The system may compare inputted text to a database of keywords predetermined as positive, negative, and/or neutral to determine if the inputted text is positive, negative, and/or neutral. The system may determine whether the inputted text is positive, negative, and/or neutral based on determining a match between the inputted text and the stored keywords. A positive, negative, and/or neutral determination may respectively correlate to a numerical value. For example, a positive determination may equate to +1, a negative determination may equate to −1, a neutral determination may equate to 0, and/or the like. These determined numerical values may be inputted into an algorithm responsible for generating a unique rating score for the work of art as a whole and/or for a specific rating criterion. The first user, the second user, and/or another user (e.g., an administrator) may be enabled to add, delete, or modify the list of keywords in the database. Additionally, the system may automatically determine, based on context clues in text comments and/or other inputs provided by second users, whether a word is positive, negative, and/or neutral. The system may utilize one or more machine learning techniques and/or trainings to accomplish this.

A selected color may be associated with an emotion felt by the second user and/or evoked by a work of art. The second user may select the color via a color wheel, a color palette, a color slider, a selection menu, and/or via other selection means. The system may determine one or more numerical values (red, green, and blue (RGB) values, cyan, yellow, magenta, and black values, a hexidecimal, a hue, saturation, or the like) corresponding to the selected color. For example, a teal blue color may correspond to R-62, G-200, and B-228. These determined numerical values may be inputted into an algorithm responsible for generating a unique rating score for the work of art as a whole and/or for a specific rating criterion. The system may utilize one or more reference tables comprising one or more numerical values to determine numerical values associated with various colors.

A selected numerical value may communicate how much and/or what extent a second user likes and/or dislikes a work of art as a whole and/or with respect to a specific rating criterion. The numerical value may be selected via an input slider with a range of 1-10, inputted as text, selected as a button, and/or via any other selection means. For example, if the second user strongly likes the work of art as a whole, then he may select 10, whereas another second user that dislikes the work of art as a whole then she may select a 1. The scale may be configurable by the first user, the second user, and/or another user (e.g., an administrator). The selected numerical value may be inputted into an algorithm responsible for generating a unique rating score for the work of art as a whole and/or for a specific rating criterion.

The selected emoticon (e.g., a smiley face, an icon, an image, an emotion, an emoji, and/or the like) may be associated with an emotion felt by the second user and/or evoked by the work of art. The second user may select the emoticon via a selection menu and/or via other input means. The system may be configured to analyze the inputted emoticon to identify, extract, and/or process emoticons that are associated with particular positive, negative, and/or neutral emotions. For example, if the second user inputs a smiley face "s" then the system may determine that the inputted emoticon is positive. The system may compare inputted emoticon to a database of emoticon predetermined as positive, negative, and/or neutral to determine whether the inputted emoticon is positive, negative, and/or neutral. The system may determine whether the inputted emoticon is positive, negative, and/or neutral based on determining a match between the inputted emoticon and the stored emoticon. A positive, negative, and/or neutral determination may respectively correlate to a numerical value. For example, a positive determination may equate to +1, a negative determination may equate to −1, a neutral determination may equate to 0, and/or the like. These determined numerical values may be inputted into an algorithm responsible for generating a unique rating score for the work of art as a whole and/or for a specific rating criterion. The first user, the second user, and/or another user (e.g., an administrator) may be enabled to add, delete, or modify the list of emoticon in the database. Additionally, the system may automatically determine, based on context clues in text comments and/or other inputs provided by second users, whether an emoticon is positive, negative, and/or neutral. The system may utilize one or more machine learning techniques and/or trainings to accomplish this.

FIG. 3 illustrates an exemplary user interface for providing feedback using the response system. The exemplary user interface depicted in FIG. 3 may be transmitted to the second user's device when he selects the "Rate" 16 button from the Home Page. In some embodiments, another interface may be used by the second user, perhaps as described with respect to FIGS. 10A through 10D. In some embodiments, the feedback interface for rating a piece of music may be embedded in an email, on a webpage, in a social media platform, in a media player, and/or the like. In some embodiments, the second user may not utilize the "Rate" 16 button to evaluate an aspect of the piece of music. Again, the feedback interface may be presented to the second user in a variety of ways.

When rating the piece of music, the second user may select a rating criterion that he wishes to evaluate by selecting the "Rating Criterion" 25 button. The rating criterion may include an element, an instrument, a rating criterion, a mix, an aspect of the piece of music, a custom rating criterion, an aspect of a product, and/or the like. The rating criteria may be selected from a list or a menu of icons, text, images, and/or the like. In some embodiments, the second user may create his own rating criterion that he wishes to evaluate. In some embodiments, the second user may input text to define a custom rating criterion. The user may learn more about the selected rating criterion and/or its associated rating scale by selecting the "i" 26 button. To be sure, rating criteria may be presented to the second user in a variety of ways on the feedback interface and is not limited to selection from a drop-down menu.

Once a rating criterion is selected and/or inputted, the second user may select a rating score to associate with the selected rating criterion. The rating score may be selected using a rating slider 27, a text entry field, a menu, a list, and/or the like. The rating slider 27 may define a scale determined by the rating criterion and/or disclosed via the "i" 26 button.

For example, the scale of the rating slider 27 may include a range of at least one numerical value, qualitative value, and/or the like. The scale may operate along a numerical value range from 0 to 10. From this scale and using the rating slider 27, the second user may select a rating score of 7.8, for example, because he liked the selected rating criterion (e.g., an instrument) at a specific point in time. The system may automatically associate the selected rating score with the selected rating criterion in a database. The purpose of the rating score may be to quantify how much the second user likes and/or dislikes a certain aspect of the work of art. Upon selection of a numerical value using the slider 27, the system may identify and/or determine a timestamp and/or a time at which the numerical value is selected. This may help indicate, for example, that a particular instrument is liked at a specific point during playback of a song.

The second user may also associate a color with the rating criterion via a color slider 28. Associating a color with an aspect of a piece of music may help the second user express how the aspect of a piece of music makes him feel at a specific point in time. The first user in turn may receive this information and thus be able to determine a second user's emotional response that is elicited by a piece of music. Upon selection of a color using the slider 28, the system may identify and/or determine a timestamp and/or a time at which the color is selected. This may help indicate, for example, that a particular instrument invokes a feeling associated with the selected color at a specific point during playback of a song.

Each color determined by the color slider 28 may correspond to at least one RGB (red-green-blue) value, CMYK (cyan-magenta-yellow-black) value, and/or one or more similar color values. The at least one RGB or CMYK value may be associated with a numerical value, determined in some embodiments using one or more reference tables. For example, the color red's RGB value may be 255, 0, 0 respectively. Another example may be teal's CMYK value of 100, 0, 0, 50 respectively. In other embodiments, color values may be associated with a HEX number, HTML, CSS, similar computer languages, and/or the like. Additionally, the second user may also input notes via the "Notes" 29 button. The second user's notes may be text, a keyword, an image, an emoticon, and/or the like. In some embodiments, the second user may input a custom rating criterion.

When the second user is done evaluating the piece of music, he may select the "Done" 30 button. Selecting the "Done" 30 button may enable the system to transmit the information associated with the second user's opinion (a rating criterion selection, a rating score, at least one color value, an emoticon, text, notes, and/or the like) from the second user's device to the system's server, a database, or the like. The second user may be rewarded with a virtual currency, points, and/or the like for submitting his opinion via the response system.

FIG. 10A is an exemplary feedback interface 1000 displayed to second users. The interface 1000 may enable a user 1002 (e.g., a first user and/or a second user) to provide feedback on a work of art using a user device 1004. In some embodiments, the interface 1000 may include a menu button 1006, display information 1008 associated with the work of art and/or other information such as a time 1010, a duration of a song, and/or the like. The user may be enabled to share 1012 the work of art with others on a variety of platforms, such as email, text messaging, SMS messaging, Bluetooth, an internal messaging system, a social media network, a music streaming service platform, and/or the like. Player controls 1014 may enable the user to control the playback of media content as mentioned above. Button 1016 may represent a "Rate" button as mentioned above.

Upon selection of the button 1016, buttons associated with one or more instruments 1018, 1020, 1022, 1024 (e.g., rating criterion, elements, and/or the like) may appear on the feedback interface 1000. In some embodiments, a button and/or selectable portion of an interface may refer to and/or include an instrument button, and/or vice versa. In some embodiments, the user may simply click and hold down (e.g., engage) the button 1016 to cause the one or more instruments, options of rating criteria and/or elements, and/or means for selecting the same to appear. For example, the options of instruments and/or the like may appear as a pop-up menu on the feedback interface 1000. Releasing and/or disengaging the button 1016 may cause the pop-up menu of options to disappear. Releasing and/or disengaging the button 1016 may cause the pop-up menu of options to remain visible and/or accessible to the user. In some embodiments, engaging the button 1016 may include touching a portion of a touchscreen, touching and holding a portion of a touchscreen, performing a gesture on a portion of a touchscreen, swiping on a touchscreen, sliding on a touchscreen, dragging on a touchscreen, tapping on a touchscreen, clicking, clicking and holding, dragging using a mouse, and/or the like. In some embodiments, a pop-up menu displaying options of selectable instruments may be voice-activated and/or gesture activated (e.g., facial gesture, body movement, and/or the like) as recognized by a microphone and/or camera of the user device 1004.

Each instrument button 1018, 1020, 1022, 1024 may be represented by a button, selectable portion, interface portion, a slider, a touchscreen, a wheel, a menu, and/or any other input means on the feedback interface. For example, a first button 1018 may be associated with a first instrument (e.g., a guitar), whereas a second button 1020 may be associated with a second instrument (e.g., drums). Selecting a portion of the interface associated with an instrument (e.g., button 1018) may communicate that the second user likes and/or dislikes that particular instrument in a song. For example, if the second user is listening to a song and likes the guitar, he may select the button on the feedback interface that represents the guitar to denote the same. The system may automatically identify and/or determine at which point in time during playback of the song that the user selected the button. In some embodiments, the system may utilize an API of a third-party media player, music streaming platform, and/or the like to identify a point in time in the song at which a user selection was made. In this manner, a timestamp may be assigned to a selection of an instrument and/or selection of a feedback button.

FIG. 10B illustrates an exemplary feedback interface 1026 that utilizes another type of selection means for enabling a second user to indicate whether he/she likes and/or dislikes an element (e.g., instrument) of a song. More particularly, one or more sliders 1028, 1030, 1032, 1034 may be used to indicate whether a second user likes and/or dislikes an element (e.g., instrument) of a song. Each slider 1028, 1030, 1032, 1034 may be associated with a different instrument in an arrangement of a song, element of the song, and/or the like. As the song plays, the second user may slide one or more sliders 1028, 1030, 1032, 1034 in a first direction (e.g., up, to the right, and/or the like) to indicate that he/she likes a corresponding instrument at a particular point in time. Similarly, the second user may slide one or more sliders 1028, 1030, 1032, 1034 in a second direction (e.g., down, to the left, and/or the like) to indicate that he/she dislikes a corresponding instrument at a particular point in time. The sliders 1028, 1030, 1032, 1034 may be oriented vertically, horizontally, and/or in another configuration on the feedback interface 1026.

In some embodiments, a selection of an instrument may be made using the sliders 1028, 1030, 1032, 1034. Making a selection may include moving a first portion (e.g., fader, head, finger rest, and/or the like) of a slider from a first location on the interface to a second location on the interface. In some embodiments, moving the first portion of a slider may include clicking, touching, dragging, holding and dragging, swiping, flicking, and/or performing another gesture.

FIG. 10C illustrates an exemplary feedback interface 1036 that utilizes another type of selection means for enabling a second user to indicate whether he/she likes and/or dislikes an element (e.g., instrument) of a song. More particularly, a pair of buttons 1038, 1040, 1042, 1044 may be used to indicate whether a second user likes and/or dislikes an element (e.g., instrument) of a song. Each pair of buttons 1038, 1040, 1042, 1044 may be associated with a different instrument in an arrangement of a song, element of the song, and/or the like. As the song plays, the second user may select one or more buttons 1038, 1040, 1042, 1044 in a first direction (e.g., an up arrow button, a right arrow button, and/or the like) to indicate that he/she likes a corresponding instrument at a particular point in time. Similarly, the second user may select one or more buttons 1038, 1040, 1042, 1044 in a second direction (e.g., a down arrow button, a left arrow button, and/or the like) to indicate that he/she dislikes a corresponding instrument at a particular point in time. The buttons 1038, 1040, 1042, 1044 may be oriented vertically, horizontally, and/or in another configuration on the feedback interface 1036. Again, a selection may be made by clicking, touching, dragging, tapping, pointing, holding and dragging, swiping, flicking, and/or performing another gesture on the interface.

FIG. 10D illustrates an exemplary feedback interface 1046 that utilizes another type of selection means for enabling a second user to indicate whether he/she likes and/or dislikes an element (e.g., instrument) of a song. More particularly, FIG. 10D illustrates how the interactive music feedback system described herein may integrate with a third-party media player, a music streaming platform, and/or the like. The buttons 1016 of an interface may include thumbs-up and/or thumbs-down buttons. In some embodiments, these thumbs-up and/or thumbs-down buttons may be included in a third-party media player.

Traditionally, a thumbs-up button may be selected by a listener when she/he likes a song. Selecting the thumbs-up button may cause the particular song to be played more frequently, added to a playlist, added to a list of favorites, kept playing in steady rotation, and/or the like. Conversely, a thumbs-down button may be selected by a listener when she/he dislikes a song. Selecting the thumbs-down button may cause the particular song to be played less frequently, removed from a playlist, added to a list of songs not to be played, removed from rotation, and/or the like. In this manner, the thumbs-up and/or thumbs-down buttons may be used by a listener to tailor his/her playlists, radio experiences, content delivery, and/or the like.

To improve upon this feature, the interactive feedback system described herein may enable the listener (e.g., second user) to indicate exactly what he/she likes and/or dislikes about a song rather than simply indicating that he/she likes and/or dislikes the song at a high level. This ability to provide more detailed feedback may improve the listener's ability to tailor playlists, radio experiences, content delivery, and/or the like so that he/she receives content more relevant to his/her preferences.

For example, as described above, the second user may be presented with a pop-up menu 1048 upon selection of a thumbs-up and/or thumbs-down button. This pop-up menu 1048 may present various options to the second user for providing feedback as to what he/she likes and/or dislikes about the song. For example, after selecting a thumbs-up button, the second user may wish to indicate that it is this particular song that he likes. As another example, the second user may instead indicate that it is not the song that is preferential, but rather the artist, the album on which the song is featured, and/or the like. Similarly, the second user may indicate that a particular element of the song, such as an instrument, a lyric, a key, a vibe, and/or any other element is enjoyed. This information may or may not be timestamped as described above. Thumbs-up and/or thumbs-down buttons may also include up-arrow and/or down-arrow buttons, a favorite button, a heart button, a like button, a reaction button, a dislike button, a comment button, a menu button, a "more" button, a voting button, a rating button, a rate button, a feedback button, an interaction button, a review button, and/or the like. Each of these terms may refer to one another. Additionally, the term "button" may refer to a variety of interface elements including a tab, a slider, a wheel, an interface portion, a selectable interface portion, a gesture pad, a directional pad, a home button, a side button, a volume button, a power button, a touchscreen portion, a sensor, and/or any other I/O device embodied in hardware and/or software.

Via the pop-up menu 1048, the second user may be enabled to select from a list of options, perhaps including one or more buttons 1050, 1052, 1053, 1056 corresponding to various instruments included in the song's arrangement. Other forms of indicating likes and/or dislikes may include the use of sliders, buttons, tabs, gestures, voice commands, text inputs, numerical inputs, color inputs, emoticon inputs, and/or any other method. One or more elements, instruments, and/or rating criterion as described above may be selected by the user.

In some embodiments, the pop-up menu 1048 may be presented to the user upon clicking and/or touching a thumbs-up and/or thumbs-down button. In some embodiments, the pop-up menu 1048 may be presented to the user upon clicking and holding down a thumbs-up and/or thumbs-down button. In some embodiments, any gesture and/or interaction with a thumbs-up and/or thumbs-down button may activate the pop-up menu 1048. The pop-up menu 1048 may also be activated by a swipe, voice commands, facial gestures, and/or the like.

In some embodiments, the options presented to the second user via the pop-up menu 1048 may include one or more of the following: song, artist, album, genre, time of day, type of event, any instrument, any element, and/or any rating criteria, a repeat feature, a loop feature, and/or the like. Additionally, in the event that the user selects a thumbs-down button, the second user may be enabled to select a "not right now" option, a "skip" option, an "inappropriate" option, and/or the like. The second use may also be enabled to create a custom instrument, element, and/or the like upon selection of the thumbs-up and/or thumbs-down buttons. Instead of the song being played less frequently in response to selection of a thumbs-down button as in traditional methods, the interactive music feedback system may simply skip to another song while keeping track of time of day preferences. The interactive music feedback system may, based on information received from these user selections, may recommend future songs that are more relevant to the second user at various times of day, better tailor playlists, customize radio experiences, ensure efficient and relevant content delivery, and/or the like.

Selection of a thumbs-up and/or thumbs-down button, an instrument, element, and/or rating criterion, an option on the pop-up menu 1048, and/or any other input may be assigned a numerical value. This numerical value may be positive, negative, and/or neutral. The numerical value may be inputted into an algorithm that generates an overall score for the work of art, a specific rating criterion, and/or the like. Any numerical values received, identified, determined, and/or generated herein may be used, along with any raw inputs received, by the system to determine a next and/or future song for the second user, generate various metrics and analytics to be presented to the first user, and/or the like. In some embodiments, the term "value" may refer to and/or include a numerical value, text, an image, an icon, a reference number, a reference, a pointer, and/or any other indicator. Each of these terms may refer to one another.

In some embodiments, the system may be configured, using a user device, to track a second user's facial, vocal, and/or bodily expressions. For example, a microphone of the user device may detect and/or receive voice commands, spoken words, and/or the like produced by the second user, such as "wow, the guitar sounds great!" or "I do not like this chorus." The system may also utilize a camera to track facial movements, facial gestures, hand movements, body movements, and/or the like. By tracking these movements (e.g., blinking, moving one's eyes, a nostril flare, pupil dilation, and/or the like), the system may be enabled to identify various human responses to a work of art that the user may not manually input. For example, the system may detect a facial movement where a second user's eyebrows raise and lips curl upward. Based on detecting these movements, the system may determine that the user smiled and thus reacted positively to the work of art at a particular point in time. Vocal, facial, body, and/or emotional responses may be classified as positive, negative, and/or neutral by the system. Similar to above, these responses may correspond to a numerical value, perhaps stored in one or more databases referenced by the system. Various facial, vocal, body, and/or emotional responses may be stored in one or more databases referenced by the system. The system may utilize various machine learning and/or training techniques to amass these databases and/or assign numerical values to identified movements, responses, and/or the like. In some embodiments, the system may record and/or store audio, image, and/or video files of one or more users for reference, analysis, machine learning, and/or other purposes.

Once the second user inputs and/or submits his/her response via the feedback interface, inputs may be transmitted to a processing unit of the system for processing. In some embodiments, inputs received at a user device may be transmitted instantaneously (e.g., substantially simultaneously to their receipt at the user device). In some embodiments, inputs received at a user device may be transmitted at predetermined intervals. In some embodiments, inputs received at a user device may be transmitted once playback of a song has ended. In some embodiments, inputs received at a user device may be transmitted once an application associated with the feedback interface has been closed and/or its operating session has otherwise been paused and/or terminated. In some embodiments, inputs received at a user device may be transmitted once a predetermined amount of input data has been received. Inputs received at a user device may be transmitted by one or more of these delivery methods and/or any other data delivery method.

The system may be configured to store inputs received from the second user in one or more databases. At least a portion of processing described herein may occur at a user device of the first user, a user device of the second user, a central processing device, a cloud processing device, and/or any other computing device.

In some embodiments, processing the inputs may include analyzing raw input data, identifying, generating, and/or determining numerical values, transforming raw input data into numerical values, and/or the like. Through analysis of the inputs, the system may be configured to generate a wide variety of metrics associated with the work of art. For example, the system may compile multiple users' inputs to produce an overall rating score of a song, an average color of an image, a ranked order of rating criterion, a graph of the popularity of responses, an average emotion or emoticon to be associated with the work of art and/or a specific rating criterion, and/or another metric for an audience as a whole and/or a specific rating criterion. As another example, the system may generate a graph illustrating in time where specific instruments and/or elements are liked and/or disliked. In this way, the present invention may enable the first user to better understand the preferences of second user(s) who reviewed the work of art. These metrics may include an system-generated report of results that is made available to the first user, the second user, a group of users, and/or the general public.

The system is configured to generate an overall rating score based on the received inputs. For example, the system may be configured to generate a score using at least one raw input received from at least one second user and/or at least one numerical value associated with raw input received from at least one second user. Upon its generation, a rating score may be associated with and/or assigned to the work of art in one or more databases by the system.

The system may further be configured to retrieve, store, track, analyze, and/or process a total number of plays, reviews, responses, a location associated with each user and/or response, and/or a variety of other demographic, profile, and/or other user information. The system may also be configured to retrieve, store, track, analyze, and/or process information associated with the first user and/or the second user (or another user). Information associated with users may include but is not limited to location information (e.g., a zip code, global positioning system (GPS) coordinates, an IP address, a mailing address, an area code, a hometown, a headquarters, and/or the like), contact information (e.g., an email address, a username, a phone number, a mailing address, a social network profile, and/or the like), user preferences, a user history of activity, and/or the like. The system may process and/or otherwise utilize this information associated with the users to perform actions, generate targeted analytics, and/or suggestions as explained below.

The system may be configured to generate a report that includes a wide array of metrics associated with the feedback retrieved from one or more second users. The report may be accessible by the first user, the second user, a group of users, and/or the general public. The report may also be private.

The report may include a system-generated optimized tour route or travel schedule using location information associated with one or more users. The report includes demographic information associated with the second user. The report is generated either substantially simultaneously to generation of the rating score, or at a time after generation of the rating score.

The system may be configured to provide the first user with at least one suggestion and/or recommendation on how to improve the work of art based on processing the input received from second users. Text, an image, graphs, and/or other information may be presented to the first user with creative recommendations for improving the work of art, an element of the work of art, and/or the like. For example, if the work of art is a song and the song includes some digital clipping, the apparatus may suggest to the first user (e.g., the creator of the work of art) that they need to rerecord or reprocess the song to achieve a maximum level of audio quality. In some embodiments, a message comprising a recommendation may be generated by the system and/or transmitted to the first user and/or other users. The system may also be configured to determine a level of perceived audio quality based at least in part on input received from second users.

FIG. 4 depicts exemplary results of the response system. Based the analysis of the received information associated with the second user's opinion (e.g., input and/or processed input), the system may automatically produce various numerical scores 31 and/or suggestions 32 on how to improve certain aspects of the piece of music, as depicted in FIG. 4. The system may also identify which aspects of a piece of music are critical to its overall rating score based on its analysis of inputs. The system may also analyze the received information and/or inputs to project a probability of commercial success of a piece of music. These suggestions and projections may be transmitted to the first user for viewing and review.

In some embodiments, the system may generate a graph 33 that shows peaks and valleys associated with where the piece of music was liked or disliked, and by how much. The height (e.g., amplitude) of each peak and/or valley may correspond with a number of similar responses received. For example, a peak representing 10 people that liked the guitar at point A in a song may be higher than a peak representing 3 people that liked the guitar at point B. The graphs produced may relate to an overall score for the work of art and/or specific rating criteria. The drawn line may correspond to the value of the rating score at each point in time, the number of similar responses, the strength of responses, and/or the like. The line color in graph 33 may correspond to a selected color, if any.

FIG. 4 illustrates that a generated report may also include a map of users' demographic information (a name, a username, an age, a zip code, an email address, and/or the like). An analysis of the at least one second user's demographic information may enable the system to determine an optimal touring route for the first user. The audience demographic information (e.g., of second users) may be sorted and/or viewed by the first user. Demographic information may also enable the first user to seek feedback from specific demographics in specific locations.

FIG. 10E illustrates an exemplary user interface 1058 displaying results to the first user. In some embodiments, the results may include a graph 1060 of which instruments were liked and/or disliked, and how much, over the duration of a song. The system may aggregate input received from multiple second users who reviewed the same song to produce the graph 1060. The number of similar responses may correspond to the height of each stem. Each stem may represent an instrument, element, and/or the like. The system may identify a best-fitting location, a trend, an average, and/or other summations of input to produce each stem; in this way, a fewer number of stems may represent a large aggregate of input data. The first user may also be enabled to sort 1062 various rating criteria so that only certain rating criteria are displayed on the graph 1060. For example, the first user may view aggregated feedback associated with every instrument in a song, aggregated feedback associated with select instruments, and/or aggregated feedback associated with only one instrument. The first user may also be enabled to view each individual review, all inputs provided by one second user, all raw input submitted by all second users, and/or the like. In some embodiments, the system may layer multiple sets of feedback on top of each other, where each layer is independently viewable.

In some embodiments, the instrument stems in graph 1060 may correspond to sections of a song. For example, the first stem labeled "INST. 1" may correspond to a favorable first verse, whereas the second stem labeled "INST. 2" may correspond to a slightly unfavorable first chorus. In some embodiments, the system may be configured to automatically identify sections of a song based on input data received from second users, a point in time in the song at which input was received, and/or any combination of information contemplated herein. The system may provide a summary indicating which song sections are favored and/or unfavored, most and/or least critical to the song's success, and/or the like.

FIG. 10F illustrates an exemplary user interface 1064 displaying results to the first user. Graph 1066 illustrates a popularity chart for each instrument in a song. Each bar may be associated with a different instrument. Based on the aggregate of received input from second users, the system may identify which instrument is most popular according to the number of likes and/or dislikes, the strength of likes and/or dislikes, and/or any other factors. The first user may also sort 1062 between various instruments, elements, rating criteria, second users, and/or the like to view different layers of data.

The system may further include a dashboard that enables the first user to manage his/her content (e.g., works of art, songs, and/or the like), view and analyze metrics associated with each work of art, message other users, upload and/or link works of art, configure rating criteria, share content to social media, and/or the like. In some embodiments, the first user may be enabled to configure rating criteria by weighting each rating criterion individually. By weighting one or more rating criteria, the first user may tailor the system-generated overall score to be more relevant to the first user's needs.

Along these lines, FIG. 5 depicts an exemplary user profile page. The system may be configured to enable the first user and/or the second user to create a profile wherein the profile contains information 35 (demographic information, location information, an image, contact information, profile status, and/or the like). The score field may keep track of points and/or virtual currency earned by the user. At least one piece or a combination of this information may be analyzed by the system to help the first user understand second users, calculate numerical values, generate graphs of feedback, process user inputs, produce reports of analytics for works of art, generate recommendations for next and/or future content for users, and/or the like. The system may support manual and/or automatic entry of this information.

A "Menu" 2 button may be included throughout the interface that may allow for easy navigation. Included in the "Menu" 2 button may be a "Media" 36 button that allows the first user and/or the second user to select a piece of music, a video clip, and/or other content for reviewing. A "Manager" 37 button may enable the first and/or the second user to manage his profile, upload media, review analytics, and/or the like. A "Messages" 38 button may provide access to the system's internal messaging system and/or an external messaging system. A "Settings" 39 button may allow changes to be made to preferences, privacy, and/or the like. An "Exit" 40 button may close the program.

As seen in FIG. 6, the system may enable the first user and/or the second user to set preferences, settings, and/or the like. Also, the first user and/or the second user may be enabled to define a color via a color preference slider. Based on an analysis of the at least one color value associated with this defined color preference, the system may suggest a next piece of music, a playlist, an advertisement, and/or the like based on the user's selected color. In some embodiments, the analysis may operate similarly to the aforementioned method of extracting the at least one color value from the selected color. In some embodiments, the analysis may operate differently to the aforementioned method of extracting the at least one color value from the selected color. In some embodiments, the color preference value may be treated as an input, and thus may be utilized in various processes described herein. In some embodiments, the system may award virtual currency, points, and/or the like to the first user and/or the second user based on how often the first user and/or the second user changes or modifies the color preference.

More generally, the system may be configured to award users an amount of a virtual currency (e.g., points, rewards, monetary funds, credits, and/or the like) in exchange for performing a variety of actions. For example, a user may be awarded points for uploading the work of art for review, reviewing analytics and feedback, creating and/or transmitting a predetermined number of feedback requests, creating and/or transmitting a predetermined number of feedback requests within a predetermined period of time, creating and/or transmitting a predetermined number of feedback requests to a predetermined number of recipients, and/or the like. As another example, a user may be awarded points for listening and/or providing feedback to the work of art, referring the work of art to a friend, sharing the work of art via social media, and/or the like. A user may be incentivized with virtual currency, points, and/or a similar reward to share their demographic information, to provide feedback, to review a predetermined number of works of art, to review a predetermined number of works of art within a predetermined time period, to enable particular types of input collection (e.g., enable camera and/or microphone monitoring), and/or for taking any other action described herein. In some embodiments, virtual currency may be redeemed for subscriptions, access to various other features of the system, and/or the like.

The system may process a selected rating score, a color value and/or a numerical value associated with a selected color, text, notes, feedback interface selections, audio footage of a user, video footage of a user, and/or any combination of the aforementioned by inputting them into an algorithm for computing one or more scores. Any of this information may also be used in any combination to determine a next song and/or future content for a second user. Any of this information may also be used in any combination to generate various metrics and/or analytics for the first user.

In some embodiments, one or more inputs may be weighted in computing an overall rating score. For example, if the user inputs a guitar's rating score of 7.8, a color of red, a smiley face in the notes, and enters the keywords "love"

and "guitar" in the notes, the system may increase the 7.8 to an 8.0 based on the additional positive inputs. Different combinations of color values, emoticons, keywords, numerical values, feedback interface selections, voice commands, facial gestures, and/or other inputs may have different effects on the rating value. In some embodiments, inputs may be processed according to a logarithmic scale. In some embodiments, inputs may be processed according to a linear regression model. In some embodiments, the inputs may be processed in another mathematical way.

As demonstrated above, the system may transmit processed information (e.g., reports, analytics, metrics, recommendations, and/or the like) to the first user for viewing and/or further analysis. Other pieces of information that are transmitted by the system to the first user may include but is not limited to a point in time when a listener pressed "Next" and/or skipped the user's song, a total number of plays, a total number of likes, a total number of dislikes, a total number of playlist adds, a total number of page views, a total number of shares, a total number of reviews, a total number of fans, a total number of friends, a predictability score of success, a point value, an overall score, a virtual currency value, a numerical value, and/or the like. The system may be configured to capture, store, transmit, and/or display at least one of the aforementioned pieces of information. The system may transmit recommendations for media content and/or second media content to the second user in response to the second user completing a review of first media content.

The system may be configured to determine an overall and/or average color of an image an album cover and/or other image. The system may analyze an image by receiving its color values in a similar method as the one described above and determining an average, a majority, or similar assumption to identify and associate a color label with the image. In some embodiments, the system may identify the color of the image by determining the at least one color value associated with each pixel. Another method may be used as well.

FIG. 8 illustrates an exemplary process flow 800 for generating a rating score based on a variety of inputs. At block 810, the process includes receiving at least one input, wherein the at least one input comprises at least one of a first numerical value, an emoticon, a color, or at least one keyword. At block 820, the process includes processing the at least one input. At block 830, the process includes generating a second numerical value based on processing the at least one input.

FIG. 7 presents an exemplary block diagram of the system environment 700 for implementing the interactive music feedback system described herein. As illustrated, the system environment 700 may include a network 710, a system 730, and/or a user input system 740. Also shown in FIG. 7 is a user 745 of the user input system 740. The user input system 740 may be a mobile device described herein. The user 745 may be a person who uses the user input system 740 to execute a user application 747, such as a first user and/or a second user. The user application 747 may be an application to communicate with the system 730, facilitate the playing and/or reviewing of media content, enable the inputting of information onto a user interface presented on the user input system 740, or the like. The user application 747 and/or the system application 737 may incorporate one or more parts of any process described herein.

As shown in FIG. 7, the system 730 and the user input system 740 may each be operatively and/or selectively connected to the network 710, which may include one or more separate networks. In addition, the network 710 may include a telecommunication network, local area network (LAN), a wide area network (WAN), a Bluetooth network, and/or a global area network (GAN), such as the Internet. It will also be understood that the network 710 may be secure and/or unsecure and may also include wireless and/or wireline and/or optical interconnection technology.

The user input system 740 may include any computerized apparatus (e.g., device) that can be configured to perform any one or more of the functions of the user input system 740 described and/or contemplated herein. For example, the user 745 may use the user input system 740 to transmit and/or receive information or commands to and from the system 730. In some embodiments, for example, the user input system 740 may include a personal computer system (e.g., a non-mobile or non-portable computing system, a motor vehicle, or the like), a mobile computing device, a personal digital assistant, a mobile phone, a tablet computing device, a network device, and/or the like. As illustrated in FIG. 7, in accordance with some embodiments of the present invention, the user input system 740 may include a communication interface 742, a processor 744, a memory 746 having an user application 747 stored therein, and/or a user interface 749. In such embodiments, the communication interface 742 may be operatively and/or selectively connected to the processor 744, which may be operatively and/or selectively connected to the user interface 749 and the memory 746. In some embodiments, the user 745 may use the user application 747 to execute processes described herein.

Each communication interface described herein, including the communication interface 742, may include hardware, and, in some instances, software, that enables the user input system 740, to transport, send, receive, and/or otherwise communicate information to and/or from the communication interface of one or more other systems on the network 710. For example, the communication interface 742 of the user input system 740 may include a wireless transceiver, modem, server, electrical connection, and/or another electronic device that operatively connects the user input system 740 to another system such as the system 730. The wireless transceiver may include a radio circuit to enable wireless transmission and/or reception of information. Additionally, the user input system 740 may include a positioning system. The positioning system (e.g., a global positioning system (GPS), a network address (IP address) positioning system, a positioning system based on the nearest cell tower location, and/or the like) may enable at least one of the user input system 740, an external server, and/or a computing device in communication with the user input system 740 to determine the location (e.g., location coordinates) of the user input system 740.

Each processor described herein, including the processor 744, may include circuitry for implementing the audio, visual, and/or logic functions of the user input system 740. For example, the processor may include a digital signal processor device, a microprocessor device, and various analog-to-digital converters, digital-to-analog converters, a camera, a microphone, and/or other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 747 of the memory 746 of the user input system 740.

Each memory device described herein, including the memory 746 for storing the user application 747 and/or other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally and/or alternatively include an EEPROM, flash memory, and/or the like. The memory may store any one or more of pieces of information and/or data used by the system in which it resides to implement the functions of that system.

As shown in FIG. 7, the memory 746 may include the user application 747. In some embodiments, the user application 747 may include an interface for communicating with, navigating, controlling, configuring, and/or using the user input system 740. In some embodiments, the user application 747 may include computer-executable program code portions for instructing the processor 744 to perform one or more of the functions of the user application 747 and/or system described and/or contemplated herein. In some embodiments, the user application 747 may include and/or use one or more network and/or system communication protocols.

Also shown in FIG. 7 is the user interface 749. In some embodiments, the user interface 749 may include one or more output devices, such as a display and/or a speaker, for presenting information to the user 745. In some embodiments, the user interface 749 may include one or more input devices, such as one or more buttons, keys, dials, levers, directional pads, joysticks, accelerometers, controllers, microphones, touchpads, touchscreens, haptic interfaces, microphones, scanners, motion detectors, cameras, biometric scanners, and/or the like for receiving information from the user 745. In some embodiments, the user interface 749 may include the input and display devices of a mobile device, which are operable to receive and display information. The user interface 749 may include a feedback interface and/or various selectable portions as described above.

FIG. 7 also illustrates a system 730, in accordance with an embodiment of the present invention. The system 730 may refer to the "system" and/or "apparatus" described herein. The system 730 may include any computerized apparatus (e.g., computing device) that can be configured to perform any one or more of the functions of the system 730 described and/or contemplated herein. In accordance with some embodiments, for example, the system 730 may include a computer network, an engine, a platform, a server, a database system, a front end system, a back end system, a personal computer system, and/or the like. In some embodiments, such as the one illustrated in FIG. 7, the system 730 includes a communication interface 732, a processor 734, and a memory 736, which includes a system application 737 and a datastore 738 stored therein. As shown, the communication interface 732 is operatively and selectively connected to the processor 734, which is operatively and/or selectively connected to the memory 736.

It will be understood that the system application 737 may be configured to implement any one or more portions of the various user interfaces and/or processes described herein. The system application 737 may interact with the user application 747. It will also be understood that, in some embodiments, the memory may include other applications such as music streaming services, social media platforms, media players, and/or the like. It will also be understood that, in some embodiments, the system application 737 may be configured to communicate with the datastore 738, the user input system 740, and/or the like.

It will be further understood that, in some embodiments, the system application 737 may include computer-executable program code portions for instructing the processor 734 to perform any one or more of the functions of the system application 737 described and/or contemplated herein. In some embodiments, the system application 737 may include and/or use one or more network and/or system communication protocols.

In addition to the system application 737, the memory 736 may also include the datastore 738. As used herein, the datastore 738 may include one or more distinct and/or remote datastores. In some embodiments, the datastore 738 may not be located within the system and may instead be located remotely from the system. In some embodiments, the datastore 738 may store information and/or data described herein. For example, the datastore 738 may store information associated with user accounts, user inputs, reviews, processed inputs, generated reports, numerical values, reference tables, and/or the like.

It will be understood that the datastore 738 may include any one or more storage devices, including, but not limited to, datastores, databases, and/or any of the other storage devices typically associated with a computer system. It will also be understood that the datastore 738 may store information in any known way, such as, for example, by using one or more computer codes and/or languages, alphanumeric character strings, data sets, figures, tables, charts, links, documents, and/or the like. Further, in some embodiments, the datastore 738 may include information associated with one or more applications, such as, for example, the system application 737. It will also be understood that, in some embodiments, the datastore 738 may provide a substantially real-time representation of the information stored therein, so that, for example, when the processor 734 accesses the datastore 738, the information stored therein is current and/or substantially current.

It will be understood that the embodiment of the system environment illustrated in FIG. 7 is exemplary and that other embodiments may vary. As another example, in some embodiments, the system 730 includes more, fewer, and/or different components. As another example, in some embodiments, some and/or all of the portions of the system environment 700 may be combined into a single portion. Likewise, in some embodiments, some or all of the portions of the system 730 may be separated into two or more distinct portions.

In addition, the various portions of the system environment 700 may be maintained for and/or by the same or separate parties. It will also be understood that the system 730 may include and/or implement any embodiment of the present invention described and/or contemplated herein. For example, in some embodiments, the system 730 may be configured to implement any one or more of the embodiments of the processes described and/or contemplated herein in connection with any process described herein. Additionally, the system 730 and/or the user input system 740 may be configured to initiate presentation of any of the user interfaces described herein.

In accordance with embodiments of the invention, the term "module" with respect to a system may refer to a hardware component of the system, a software component of the system, and/or a component of the system that includes both hardware and software. As used herein, a module may include one or more modules, where each module may reside in separate pieces of hardware and/or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. "And" may refer to "or," and vice versa. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), and/or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and/or hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention may be written in conventional procedural programming languages, such as the "C" programming languages and/or similar programming languages. The computer program code may alternatively and/or additionally be written in one or more multi-paradigm programming languages, such as, for example, F#.

Some embodiments of the present invention are described herein with reference to figures including flowchart illustrations, block diagrams of apparatuses, systems, and/or computing environments, user interfaces, and/or methods. It will be understood that each element of the figures and/or this description and/or combinations of the same may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the figures and/or description.

The one or more computer-executable program code portions may be stored in a transitory and/or non-transitory computer-readable medium (e.g., a memory) that can direct, instruct, and/or cause a computer and/or other programmable data processing apparatus and/or system to function in a particular manner, such that the computer-executable program code portions stored in the computer-readable medium produce an article of manufacture including instruction mechanisms which implement the steps and/or functions specified in the figures and/or description.

The one or more computer-executable program code portions may also be loaded onto a computer and/or other programmable data processing apparatus, system, and/or device to cause a series of operational steps to be performed on a computer and/or other programmable apparatus. In some embodiments, this produces a computer-implemented process such that the one or more computer-executable program code portions which execute on a computer and/or another programmable apparatus provide operational steps to implement the steps specified in the figures and/or the functions specified in the specification Alternatively, computer-implemented steps may be combined with, and/or replaced with, operator- and/or human-implemented steps in order to carry out an embodiment of the present invention.

While certain exemplary embodiments have been described and/or shown in the accompanying drawings, it is to be understood that such embodiments are merely illustrative of and not restrictive on the broad invention, and that this invention should not be limited to the specific constructions and arrangements shown and described, since various other changes, combinations, omissions, modifications and/or substitutions, in addition to those set forth in the above paragraphs, are possible. Those skilled in the art will appreciate that various adaptations, modifications, and/or combinations of the described embodiments can be configured without departing from the scope and/or spirit of the invention. Therefore, it is to be understood that, within the scope of the appended claims, the invention may be practiced other than as specifically described herein.

Referring now to FIGS. 9A and 9B, FIGS. 9A and 9B illustrate an exemplary computing environment 900 for enabling listeners to provide feedback during playback of media content as described herein. FIG. 9A provides an exemplary elemental view of the computing environment, whereas FIG. 9B provides an exemplary connectivity diagram of the computing environment 900 elements. As shown, the computing environment 900 may be included in and/or utilized by any device described herein. For example, the computing environment 900 may be included in and/or utilized by one or more elements of system environment 700 of FIG. 7. More particularly, the computing environment may be included in and/or utilized by the system 730 and/or the user input system 740 of FIG. 7. Additionally, any units and/or subunits described herein with reference to FIGS. 9A and 9B may be included in one or more elements of FIG. 7. Similarly, any element and/or combination of elements in FIG. 7 may be included in and/or include any unit and/or any subunit of the computing environment 900. The computing environment 900 and/or any of its units and/or subunits described herein may include general hardware, specifically-purposed hardware, and/or software. Each unit and/or subunit of the computing environment 900 may include, utilize, and/or refer to each other.

The computing environment 900 may include, among other elements, a processing unit 902, a memory unit 904, an input/output (I/O) unit 906, and/or a communication unit 908. As described herein, each of the processing unit 902, the memory unit 904, the I/O unit 906, and/or the communication unit 908 may include and/or refer to a plurality of respective units, subunits, and/or elements. Furthermore, each of the processing unit 902, the memory unit 904, the I/O unit 906, and/or the communication unit 908 may be operatively and/or otherwise communicatively coupled with each other so as to facilitate the operations described herein.

The processing unit 902 may control any of the one or more units 904, 906, 908, as well as any included subunits, elements, components, devices, and/or functions performed by the units 904, 906, 908 included in the computing environment 900. The processing unit 902 may also control any unit and/or device included in the system 900 of FIGS. 9A and 9B. Any actions described herein as being performed by a processor may be taken by the processing unit 902 alone and/or by the processing unit 902 in conjunction with one or more additional processors, units, subunits, elements, components, devices, and/or the like. Additionally, while only one processing unit 902 may be shown in FIGS. 9A and 9B, multiple processing units may be present and/or otherwise included in the computing environment 900. Thus, while instructions may be described as being executed by the processing unit 902 (and/or various subunits of the processing unit 902), the instructions may be executed simultaneously, serially, and/or by one or multiple processing units 902 in parallel.

In some embodiments, the processing unit 902 may be implemented as one or more computer processing unit (CPU) chips and/or graphical processing unit (GPU) chips and may include a hardware device capable of executing computer instructions. The processing unit 902 may execute instructions, codes, computer programs, and/or scripts. The instructions, codes, computer programs, and/or scripts may be received from and/or stored in the memory unit 904, the I/O unit 906, the communication unit 908, subunits and/or elements of the aforementioned units, other devices and/or computing environments, and/or the like. As described herein, any unit and/or subunit (e.g., element) of the computing environment 900 and/or any other computing environment may be utilized to perform any operation. Particularly, the computing environment 900 may include a generic computing system and/or a customized computing system designed to perform the various methods described herein.

In some embodiments, the processing unit 902 may include, among other elements, subunits such as a profile management unit 910, a content management unit 912, a location determination unit 914, a graphical processing unit (GPU) 916, a selection unit 918, a reporting unit 920, a recommendation unit 922, and/or a resource allocation unit 924. Each of the aforementioned subunits of the processing unit 902 may be communicatively and/or otherwise operably coupled with each other.

The profile management unit 910 may facilitate generation, modification, analysis, transmission, and/or presentation of a user profile associated with a user. For example, the profile management unit 910 may prompt a user via a user device to register by inputting authentication credentials, personal information (e.g., an age, a gender, demographic information, and/or the like), contact information (e.g., a phone number, a zip code, a mailing address, an email address, a name, and/or the like), and/or the like. The profile management unit 910 may receive, process, analyze, organize, and/or otherwise transform any data received from the user and/or another computing element so as to generate and/or store a user profile of a user. Possible information processed by the profile management unit 910 includes personal information, contact information, location information, user preferences, a photo, a video recording, an audio recording, a textual description, a virtual currency balance, a history or log of user activity, user preferences, settings, and/or the like. In some embodiments, the profile management unit 910 may enable a user to input desired settings associated with a media content review session.

The content management unit 912 may facilitate generation, modification, analysis, transmission, and/or presentation of media content, application data, user interfaces, user inputs, report outputs, and/or the like. For example, the content management unit 912 may control an audio-visual environment and/or appearance of application data and/or user interfaces during execution of various processes. Media content for which the content management unit 912 may be responsible may include advertisements, images, text, themes, audio files, video files, documents, media content, user interfaces, and/or the like. In some embodiments, the content management unit 912 may also interface with a third-party content server and/or memory location for identifying, receiving, transmitting, and/or distributing content to one or more users.

The location determination unit 914 may facilitate detection, determination, identification, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determination unit 914 may include various sensors, a radar, and/or other specifically-purposed hardware elements for enabling the location determination unit 914 to acquire, measure, and/or otherwise transform location information. The location determination unit 914 may identify and/or control a location of a user device, a system application, a cloud-based storage system, any user, and/or any computing device described herein.

The GPU 916 may facilitate generation, modification, analysis, processing, transmission, and/or presentation of media content, user interfaces, and/or any other content. In some embodiments, the GPU 916 may be utilized to render visual content, such as a web page, for presentation on a user device. The GPU 916 may also be utilized to perform any process and/or any portion of any process described herein. The GPU 916 may also include multiple GPUs and therefore may be configured to perform and/or execute multiple processes in parallel. The GPU 916 may also include a variety of other computing processors.

The selection unit 918 may facilitate generation, modification, analysis, processing, transmission, transformation, and/or presentation of user inputs. More specifically, the selection unit 918 may detect and/or process one or more inputs provided at a user device by the first and/or second user. For example, the selection unit 918 may detect selections made on various user interfaces, such as a feedback interface, inputs provided as voice commands, gestures, and/or other means, and/or the like. The selection unit 918 may also transform detected and/or received user inputs into numerical values, aggregate user inputs from a variety of users, and/or process user inputs to generate scores, other numerical values, and/or otherwise transform raw user input into a form that is easily processible by the system. The selection unit 918 may also store user inputs in various forms (raw, processed, and/or the like) in a database associated with media content (e.g., a work of art).

The reporting unit 920 may facilitate generation, modification, analysis, processing, transmission, and/or presentation of analytic reports. The reporting unit 920 may process, analyze, transform user input into various metrics, analytics, and/or reports for one or more users (e.g., the first user). For example, the reporting unit 920 may generate reports that include graphs that plot which instruments are liked and/or disliked during playback of a song. The reporting unit 920 may utilize any user input, any user information (e.g., profile information, demographic information, location information, preferences, and/or the like) to generate scores, numerical values, graphs, comparisons, travel routes, target audiences, and/or any other report relating to how a work of art was received by the second user(s). The reporting unit 920 may generate maps, results of feedback surveys, and/or the like. It may also transmit any type of data.

The recommendation unit 922 may facilitate generation, modification, analysis, processing, transmission, and/or presentation of recommendations to users. The recommendation unit 922 may generate recommendations for both the first user and the second user. With respect to the first user, the recommendation unit 922 may generate recommendations for improvements to a work of art. Based on feedback received from second users, these recommendations or suggestions for improving a work of art may be included in reports made available to the first user after feedback has been collected from second users. With respect to the second user, the recommendation unit 922 may generate recommendations for media content delivery. For example, the recommendation unit 922 may recommend a next song for the second user to listen to based on preferences identified from previously-provided feedback. Using an analysis of user input provided by a user, the recommendation unit 922 may be harnessed to tailor the user's playlists, radio listening experiences, and/or other content delivery in a precise and preferential manner.

The resource allocation unit 924 may facilitate the determination, monitoring, analysis, and/or allocation of computing resources throughout the computing environment 900 and/or other computing environments. For example, the computing environment 900 may facilitate a high volume of (e.g., multiple) review sessions and/or transmissions between a large number of supported devices, web servers, cloud-based storage platforms, third party media players, online streaming services, social media networks, and/or other content platforms so that a first user may be enabled to collect feedback from many second users substantially in real time. Multiple first users doing this at the same time may also be desired. As such, computing resources of the computing environment 900 utilized by the processing unit 902, the memory unit 904, the I/O unit 906, and/or the communication unit 908 (and/or any subunit of the aforementioned units) such as processing power, data storage space, network bandwidth, and/or the like may be in high demand at various times during operation. Accordingly, the resource allocation unit 924 may be configured to manage the allocation of various computing resources as they are required by particular units and/or subunits of the computing environment 900 and/or other computing environments. In some embodiments, the resource allocation unit 924 may include sensors and/or other specially-purposed hardware for monitoring performance of each unit and/or subunit of the computing environment 900, as well as hardware for responding to the computing resource needs of each unit and/or subunit. In some embodiments, the resource allocation unit 924 may utilize computing resources of a second computing environment separate and distinct from the computing environment 900 to facilitate a desired operation.

For example, the resource allocation unit 924 may determine a number of simultaneous review sessions, content streaming sessions, and/or data transmissions that have been requested and/or that are currently operating. The resource allocation unit 924 may then determine that the number of sessions and/or session requests meets and/or exceeds a predetermined threshold value. Based on this determination, the resource allocation unit 924 may determine an amount of additional computing resources (e.g., processing power, storage space of a particular non-transitory computer-readable memory medium, network bandwidth, and/or the like) required by the processing unit 902, the memory unit 904, the I/O unit 906, the communication unit 908, and/or any subunit of the aforementioned units for enabling safe and efficient operation of the computing environment 900 while supporting the number of simultaneous sessions, as well as transmission of the media content. The resource allocation unit 924 may then retrieve, transmit, control, allocate, and/or otherwise distribute determined amount(s) of computing resources to each element (e.g., unit and/or subunit) of the computing environment 900 and/or another computing environment.

In some embodiments, factors affecting the allocation of computing resources by the resource allocation unit 924 may include a volume of media content requests, a number of users, a size of the media content, a duration of time during which computing resources are required by one or more elements of the computing environment 900, and/or the like. In some embodiments, computing resources may be allocated to and/or distributed amongst a plurality of second computing environments included in the computing environment 900 based on one or more factors mentioned above. In some embodiments, the allocation of computing resources of the resource allocation unit 924 may include the resource allocation unit 924 flipping a switch, adjusting processing power, adjusting memory size, partitioning a memory element, transmitting data, controlling one or more input and/or output devices, modifying various communication protocols, and/or the like. In some embodiments, the resource allocation unit 924 may facilitate utilization of parallel processing techniques such as dedicating a plurality of GPUs and/or other processors included in the processing unit 902 for processing sessions, session requests and/or distribution of media content between multiple units and/or subunits of the computing environment 900 and/or other computing environments.

In some embodiments, the memory unit 904 may be utilized for storing, recalling, receiving, transmitting, and/or accessing various files and/or information during operation of the computing environment 900. The memory unit 904 may include various types of data storage media such as solid state storage media, hard disk storage media, and/or the like. The memory unit 904 may include dedicated hardware elements such as hard drives and/or servers, as well as software elements such as cloud-based storage drives. For example, the memory unit 904 may include various subunits such as an operating system unit 926, an application data unit 928, an application programming interface (API) unit 930, a profile storage unit 932, a content storage unit 934, a training unit 936, a secure enclave 938, and/or a cache storage unit 940.

The memory unit 904 and/or any of its subunits described herein may include random access memory (RAM), read only memory (ROM), and/or various forms of secondary storage. RAM may be used to store volatile data and/or to store instructions that may be executed by the processing unit 902. For example, the data stored may be a command, a current operating state of the computing environment 900, an intended operating state of the computing environment 900, and/or the like. As a further example, data stored in the memory unit 904 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 904 may include one or more databases (e.g., references tables, a cloud-based storage platform, web servers, a secure web container, a user device, and/or the like) for storing any data described herein. Additionally or alternatively, one or more secondary databases located remotely from the computing environment 900 may be utilized and/or accessed by the memory unit 904.

The operating system unit 926 may facilitate deployment, storage, access, execution, and/or utilization of an operating system utilized by the computing environment 900 and/or any other computing environment described herein (e.g., a user device, a secure web container, a web server, a cloud-based storage platform, and/or the like). In some embodiments, the operating system may include various hardware and/or software elements that serve as a structural framework for enabling the processing unit 902 to execute various operations described herein. The operating system unit 926 may further store various pieces of information and/or data associated with operation of the operating system and/or the computing environment 900 as a whole, such as a status of computing resources (e.g., processing power, memory availability, resource utilization, and/or the like), runtime information, modules to direct execution of operations described herein, user permissions, security credentials, and/or the like.

The application data unit 928 may facilitate deployment, storage, access, execution, and/or utilization of an application utilized by the computing environment 900 and/or any other computing environment described herein (e.g., a user device, a secure web container, a web server, a cloud-based storage platform, and/or the like). For example, users may be required to download, access, and/or otherwise utilize a software application on a user device such as a smartphone in order for various operations described herein to be performed. Applications required may include a specific rating application, a social media application, a media streaming application, an Internet radio application, and/or the like. As such, the application data unit 928 may store any information and/or data associated with the application. Information included in the application data unit 928 may enable a user to execute various operations described herein. The application data unit 928 may further store various pieces of information and/or data associated with operation of the application and/or the computing environment 900 as a whole, such as a status of computing resources (e.g., processing power, memory availability, resource utilization, and/or the like), runtime information, modules to direct execution of operations described herein, user permissions, security credentials, and/or the like.

The API unit 930 may facilitate deployment, storage, access, execution, and/or utilization of information associated with APIs of the computing environment 900 and/or applications running on the same and/or any other computing environment described herein (e.g., a user device). For example, computing environment 900 may include one or more APIs for enabling various devices, applications, and/or computing environments to communicate with each other and/or utilize the same data (e.g., social media applications, music streaming applications, media players, content platforms, and/or the like). Accordingly, the API unit 930 may include API databases containing information that may be accessed and/or utilized by applications and/or operating systems of other devices and/or computing environments. In some embodiments, each API database may be associated with a customized physical circuit included in the memory unit 904 and/or the API unit 930. Additionally, each API database may be public and/or private, and so authentication credentials may be required to access information in an API database.

The profile storage unit 932 may facilitate deployment, storage, access, and/or utilization of information associated with user profiles of users by the computing environment 900 and/or any other computing environment described herein. For example, the profile storage unit 932 may store users' contact information, authentication credentials, user preferences, user history and/or log of behavior, personal information, location information, received input and/or sensor data, and/or metadata. In some embodiments, the profile storage unit 932 may communicate with the profile management unit 910 to receive and/or transmit information associated with a user's profile.

The content storage unit 934 may facilitate deployment, storage, access, and/or utilization of information associated with requested content by the computing environment 900 and/or any other computing environment described herein. For example, the content storage unit 934 may store media content (e.g., one or more images, text, videos, audio content, advertisements, metadata, user interfaces, and/or the like) to be presented to a user and/or processed during operations described herein. The content storage unit 934 may store content that may be recalled user devices, web servers, systems, and/or any other computing device during operations described herein. In some embodiments, the content storage unit 934 may communicate with the content management unit 912 to receive and/or transmit content files from/to web servers, third party content platforms, user devices, and/or the like.

The training unit 936 may facilitate deployment, storage, access, analysis, and/or utilization of machine learning techniques related to interpreting user input and/or other information (e.g., user information, location, and/or the like). For example, the training unit 936 may analyze user input to identify trends of listening habits, determine whether received user input is associated with a positive, negative, and/or neutral emotion, and/or the like. In some embodiments, the training unit 936 may be comprised in a secure network location behind a firewall so as to not be vulnerable to hacking attacks.

The secure enclave 938 may facilitate secure storage of data. In some embodiments, the secure enclave 938 may include a partitioned portion of storage media included in the memory unit 904 that is protected by various security measures. For example, the secure enclave 938 may be hardware secured. In other embodiments, the secure enclave 938 may include one or more firewalls, encryption mechanisms, and/or other security-based protocols. Authentication credentials of a user may be required prior to providing the user access to data stored within the secure enclave 938. The secure enclave 938 may include and/or be included in the encrypted data stores and/or any other data store described herein.

The cache storage unit 940 may facilitate short-term deployment, storage, access, analysis, and/or utilization of data. For example, the cache storage unit 948 may serve as a short-term storage location for data so that the data stored in the cache storage unit 948 may be accessed quickly. In some embodiments, the cache storage unit 940 may include RAM and/or other storage media types that enable quick recall of stored data. The cache storage unit 940 may included a partitioned portion of storage media included in the memory unit 904.

As described herein, the memory unit 904 and its associated elements may store any suitable information. Any aspect of the memory unit 904 may comprise any collection and arrangement of volatile and/or non-volatile components suitable for storing data. For example, the memory unit 904 may comprise random access memory (RAM) devices, read only memory (ROM) devices, magnetic storage devices, optical storage devices, and/or any other suitable data storage devices. In particular embodiments, the memory unit 904 may represent, in part, computer-readable storage media on which computer instructions and/or logic are encoded. The memory unit 904 may represent any number of memory components within, local to, and/or accessible by a processor.

The I/O unit 906 may include hardware and/or software elements for enabling the computing environment 900 to receive, transmit, and/or present information. For example, elements of the I/O unit 906 may be used to receive user input from a user via a user device, present media content and/or user interfaces to the user via the user device, and/or the like. In this manner, the I/O unit 906 may enable the computing environment 900 to interface with a human user. As described herein, the I/O unit 906 may include subunits such as an I/O device 942, an I/O calibration unit 944, and/or content driver 946.

The I/O device 942 may facilitate the receipt, transmission, processing, presentation, display, input, and/or output of information as a result of executed processes described herein. In some embodiments, the I/O device 942 may include a plurality of I/O devices. In some embodiments, the I/O device 942 may include one or more elements of a user device, a computing system, a server, and/or a similar device.

The I/O device 942 may include a variety of elements that enable a user to interface with the computing environment 900. For example, the I/O device 942 may include a keyboard, a touchscreen, a touchscreen sensor array, a controller, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device 942 may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O device 942 may communicate with one or more elements of the processing unit 902 and/or the memory unit 904 to execute operations described herein. For example, the I/O device 942 may include a display, which may utilize the GPU 916 and/or another processor to present media content to a user of a user device. The I/O device 942 may also be utilized for collecting user input (e.g., interface selections, voice commands, gestures, and/or the like).

The I/O calibration unit 944 may facilitate the calibration of the I/O device 942. For example, the I/O calibration unit 944 may detect and/or determine one or more settings of the I/O device 942, and then adjust and/or modify settings so that the I/O device 942 may operate more efficiently.

In some embodiments, the I/O calibration unit 944 may utilize a content driver 946 (and/or multiple content drivers) to calibrate the I/O device 942. For example, the content driver 946 may be installed on a user device so that the user device may recognize and/or integrate with the I/O device 942, thereby enabling media content to be displayed, received, generated, and/or the like. Additionally, the content driver 946 may facilitate the receipt, detection, retrieval, and/or recognition of user input at a user device. In some embodiments, the I/O device 942 may be calibrated by the I/O calibration unit 944 based on information included in the content driver 946.

The communication unit 908 may facilitate establishment, maintenance, monitoring, and/or termination of communications (e.g., a media streaming connection and/or distribution of media content, web application data, user input, and/or the like) between the computing environment 900 and other devices such as user devices, web servers, cloud-based storage platforms, social media platforms, media players, content platforms, other computing environments, third party server systems, and/or the like. The communication unit 908 may further enable communication between various elements (e.g., units and/or subunits) of the computing environment 900. In some embodiments, the communication unit 908 may include a network protocol unit 948, an API gateway 950, an encryption engine 952, and/or a communication device 954. The communication unit 908 may include hardware and/or software elements. In some embodiments, the communication unit 908 may be utilized to transmit and/or receive media content, user input, reports, recommendations, and/or any other data as described herein.

The network protocol unit 948 may facilitate establishment, maintenance, and/or termination of a communication connection between the computing environment 900 and another device by way of a network. For example, the network protocol unit 948 may detect and/or define a communication protocol required by a particular network and/or network type. Communication protocols utilized by the network protocol unit 948 may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment 900 and any other device, as well as any element internal to the computing environment 900, may include transforming and/or translating data from being compatible with a first communication protocol to being compatible with a second communication protocol. In some embodiments, the network protocol unit 948 may determine and/or monitor an amount of data traffic to consequently determine which particular network protocol is to be used for establishing a web browsing session, a network connection, distributing web content, transmitting data, and/or performing other operations described herein.

The API gateway 950 may facilitate the enablement of other devices and/or computing environments to access the API unit 930 of the memory unit 904 of the computing environment 900. For example, a user device may access the API unit 930 via the API gateway 950. In some embodiments, the API gateway 950 may be required to validate user credentials associated with a user of a user device prior to providing access to the API unit 930 to the user. The API gateway 950 may include instructions for enabling the computing environment 900 to communicate with another device.

The encryption engine 952 may facilitate translation, encryption, encoding, decryption, and/or decoding of information received, transmitted, and/or stored by the computing environment 900. Using the encryption engine, each transmission of data may be encrypted, encoded, and/or translated for security reasons, and any received data may be encrypted, encoded, and/or translated prior to its processing and/or storage. In some embodiments, the encryption engine 952 may generate an encryption key, an encoding key, a translation key, and/or the like, which may be transmitted along with any data content.

The communication device 954 may include a variety of hardware and/or software specifically purposed to enable communication between the computing environment 900 and another device, as well as communication between elements of the computing environment 900. In some embodiments, the communication device 954 may include one or more radio transceivers, chips, analog front end (AFE) units, antennas, processing units, memory, other logic, and/or other components to implement communication protocols (wired or wireless) and related functionality for facilitating communication between the computing environment 900 and any other device. Additionally and/or alternatively, the communication device 954 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements be provided according to the structures disclosed herein may be included in integrated circuits of any type to which their use commends them, such as ROMs, RAM (random access memory) such as DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as digital signal processors (DSP), graphics system processors (GSP), synchronous vector processors (SVP), and image system processors (ISP) all represent sites of application of the principles and structures disclosed herein.

Implementation is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

Networked computing environment such as those provided by a communications server may include, but are not limited to, computing grid systems, distributed computing environments, cloud computing environment, etc. Such networked computing environments include hardware and software infrastructures configured to form a virtual organization comprised of multiple resources which may be in geographically disperse locations.

In some embodiments, the network described herein may include any wireless and/or wired communications network that facilitates communication (e.g., transmission and/or receipt of between the computing environment 900 and any other device. For example, the one or more networks may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of," and/or other similar terms should generally be construed broadly to include situations both where communications and connections are direct between referenced elements or through one or more intermediaries between the referenced elements, including through the Internet or some other communicating network. "Network," "system," "environment," and/or other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

What is claimed is:

1. A method comprising:
providing a user interface at a user device, wherein the user interface enables a first user to control playback of audio content provided by a media content server, wherein the user interface comprises a plurality of selectable portions, wherein each selectable portion of the plurality of selectable portions represents an associated, different musical instrument featured in the audio content;
receiving, by the user interface, user input from the first user during playback of the audio content, wherein the user input comprises a selection of a selectable portion of the plurality of selectable portions at a point in time during playback;
transforming, by a processor of the user device, the user input into transformed user input, wherein the transformed user input comprises a value associated with the selected selectable portion and a timestamp of the point in time during playback at which the selection was received;
transmitting, by a communication interface of the user device, the transformed user input to a first database not comprised in the user device for storage, wherein the transformed user input is associated with at least one of the first user, a second user associated with the audio content, and the audio content in the first database; and
generating, using the transformed user input and by a computing processor, a display of user input received during playback of the audio content, wherein the display includes a horizontal axis representing duration of the audio content and an indication that a performance of the musical instrument associated with the selected selectable portion evoked an emotional response from the first user at the point in time during playback, wherein the indication has an x-coordinate along the horizontal axis representing the timestamp, wherein the indication has a y-coordinate above, on, or below the horizontal axis representing the value, and wherein the indication is displayed in a style associated with at least one of the first user and the musical instrument associated with the selected selectable portion.

2. The method of claim 1, wherein the user input is transformed into transformed user input by:
comparing the received user input and a plurality of predetermined user inputs stored in a second database comprised in the user device;
determining a match between the received user input and a first predetermined user input comprised in the plurality of predetermined user inputs; and
identifying the value, wherein the value is associated with the first predetermined user input in the second database.

3. The method of claim 1, wherein the musical instrument associated with one of the selectable portions is associated with at least one audio track comprised in the audio content.

4. The method of claim 1, wherein the selection of the selectable portion indicates that the first user likes, dislikes, or feels neutral about a performance of the musical instrument associated with the selected selectable portion at the point in time during playback.

5. The method of claim 1, wherein the transformed user input is transmitted to the first database at a predetermined time.

6. The method of claim 1, wherein the transformed user input is transmitted to the first database substantially simultaneously to the receiving the user input.

7. The method of claim 1, wherein the transformed user input is used for at least one of:
identifying, by a computing processor, a musical instrument featured in the audio content whose performance is most liked; and
identifying, by a computing processor, a musical instrument featured in the audio content whose performance is least liked.

8. The method of claim 1, wherein the audio content is provided to the first user in response to receiving, by the communication interface of the user device, a request to provide user input, wherein the request comprises the user interface.

9. The method of claim 1, wherein the first user is awarded an amount of virtual currency in response to at least one of:
transmitting the audio content from the media content server to the user device;
initiating playback of the audio content at the user device;
receiving the user input;
transmitting the transformed user input to the first database;
storing the transformed user input in the first database;
sharing the audio content on a social media network; and
receiving demographic information associated with the second user.

10. The method of claim 1, wherein an amount of virtual currency is awarded to the second user in response to at least one of:
the audio content being uploaded to the media content server;
transmitting the audio content from the media content server to the user device;
initiating playback of the audio content at the user device;
receiving the user input;
transmitting the transformed user input to the first database;
storing the transformed user input in the first database;
sharing the audio content on a social media network; and
receiving demographic information associated with the second user.

11. The method of claim 1, wherein the transformed user input is used for generating, by a computing processor, a recommendation for improving the audio content.

12. The method of claim 1, wherein each selectable portion of the plurality of selectable portions comprises at least one of a button, a tab, a slider, an icon, an emoticon, a numerical value, a color, text, sensor data, and biometric data.

13. The method of claim 1, wherein the transformed user input is used for generating, by a computing processor, a ranked order of musical instruments featured in the audio content.

14. The method of claim 1, wherein a name of at least one musical instrument featured in the audio content is defined by the second user prior to the audio content being provided to the user device.

15. The method of claim 1, wherein a name of at least one musical instrument featured in the audio content is defined by the first user when the first user provides the user input at the user device.

16. The method of claim 1, wherein a name of at least one musical instrument featured in the audio content is identified by a computing processor based on an analysis of the audio content.

17. The method of claim 1, wherein the style comprises at least one of a color, a line, a stem, a shape, a label, text, an image, an icon, an emoticon, and a value.

18. The method of claim 1, wherein the transformed user input is used for determining, by a computing processor, second audio content to be provided to the first user.

19. A user device comprising:
at least one memory comprising instructions; and
at least one processing device,
wherein the instructions, when executed by the at least one processing device, cause the user device to perform the operations of:
providing a user interface at a user device, wherein the user interface enables a first user to control playback of audio content provided by a media content server, wherein the user interface comprises a plurality of selectable portions, wherein each selectable portion of the plurality of selectable portions represents an associated, different musical instrument featured in the audio content;
receiving, by the user interface, user input from the first user during playback of the audio content, wherein the user input comprises a selection of a selectable portion of the plurality of selectable portions at a point in time during playback;
transforming, by a processor of the user device, the user input into transformed user input, wherein the transformed user input comprises a value associated with the selected selectable portion and a timestamp of the point in time during playback at which the selection was received;
transmitting, by a communication interface of the user device, the transformed user input to a first database not comprised in the user device for storage, wherein the transformed user input is associated with at least one of the first user, a second user associated with the audio content, and the audio content in the first database; and
generating, using the transformed user input and by a computing processor, a display of user input received during playback of the audio content, wherein the display includes a horizontal axis representing duration of the audio content and an indication that a performance of the musical instrument associated with the selected selectable portion evoked an emotional response from the first user at the point in time during playback, wherein the indication has an x-coordinate along the horizontal axis representing the timestamp, wherein the indication has a y-coordinate above, on, or below the horizontal axis representing the value, and wherein the indication is displayed in a style associated with at least one of the first user and the musical instrument associated with the selected selectable portion.

20. A non-transitory computer readable medium of a user device comprising code, wherein the code, when executed by at least one processing device of the user device, causes the user device to perform the operations of:
providing a user interface at a user device, wherein the user interface enables a first user to control playback of audio content provided by a media content server, wherein the user interface comprises a plurality of selectable portions, wherein each selectable portion of the plurality of selectable portions represents an associated, different musical instrument featured in the audio content;
receiving, by the user interface, user input from the first user during playback of the audio content, wherein the user input comprises a selection of a selectable portion of the plurality of selectable portions at a point in time during playback;
transforming, by a processor of the user device, the user input into transformed user input, wherein the transformed user input comprises a value associated with the selected selectable portion and a timestamp of the point in time during playback at which the selection was received;
transmitting, by a communication interface of the user device, the transformed user input to a first database not comprised in the user device for storage, wherein the transformed user input is associated with at least one of the first user, a second user associated with the audio content, and the audio content in the first database; and generating, using the transformed user input and by a computing processor, a display of user input received during playback of the audio content, wherein the display includes a horizontal axis representing duration of the audio content and an indication that a performance of the musical instrument associated with the selected selectable portion evoked an emotional response from the first user at the point in time during playback, wherein the indication has an x-coordinate along the horizontal axis representing the timestamp, wherein the indication has a y-coordinate above, on, or below the horizontal axis representing the value, and wherein the indication is displayed in a style associated with at least one of the first user and the musical instrument associated with the selected selectable portion.

* * * * *